United States Patent
Estes

(10) Patent No.: US 9,973,005 B2
(45) Date of Patent: May 15, 2018

(54) SOLAR POWER CONTROLLER AND IMPEDANCE DETECTION

(71) Applicant: Solpad, Inc., Mountain View, CA (US)

(72) Inventor: Christopher A. Estes, Mountain View, CA (US)

( * ) Notice: Subject to any disclaimer, the term of this patent is extended or adjusted under 35 U.S.C. 154(b) by 0 days. days.

(21) Appl. No.: 15/271,887

(22) Filed: Sep. 21, 2016

(65) Prior Publication Data

US 2017/0012433 A1    Jan. 12, 2017

Related U.S. Application Data

(63) Continuation-in-part of application No. 13/843,573, filed on Mar. 15, 2013, now Pat. No. 9,444,397, which is a continuation-in-part of application No. PCT/US2014/028723, filed on Mar. 14, 2014, which is a continuation-in-part of application No. 14/264,891, filed on Apr. 29, 2014, now Pat. No. 9,620,993, which is a continuation of application No. 14/484,488, filed on Sep. 12, 2014, now Pat. No. 9,312,724, which is a continuation-in-part of application No. 15/095,949, filed on Apr. 11, 2016.

(60) Provisional application No. 61/719,140, filed on Oct. 26, 2012, provisional application No. 61/946,338, filed on Feb. 28, 2014.

(51) Int. Cl.
| | |
|---|---|
| *H02J 3/38* | (2006.01) |
| *H02J 3/46* | (2006.01) |
| *H02J 7/35* | (2006.01) |
| *H02S 40/32* | (2014.01) |
| *H02S 40/38* | (2014.01) |
| *H02J 9/06* | (2006.01) |
| *H02J 13/00* | (2006.01) |
| *H04W 88/08* | (2009.01) |

(52) U.S. Cl.
CPC .............. *H02J 3/383* (2013.01); *H02J 3/46* (2013.01); *H02J 7/35* (2013.01); *H02J 9/062* (2013.01); *H02J 13/0075* (2013.01); *H02S 40/32* (2014.12); *H02S 40/38* (2014.12); *H04W 88/08* (2013.01); *H02J 13/0079* (2013.01); *Y02B 10/72* (2013.01); *Y02B 70/3291* (2013.01); *Y02B 90/222* (2013.01); *Y02B 90/2653* (2013.01); *Y02E 40/72* (2013.01); *Y04S 10/123* (2013.01); *Y04S 20/12* (2013.01); *Y04S 20/248* (2013.01); *Y04S 40/126* (2013.01); *Y10T 307/625* (2015.04)

(58) Field of Classification Search
CPC ...................................................... H01H 47/00
USPC ....................................................... 307/125
See application file for complete search history.

(56) References Cited

U.S. PATENT DOCUMENTS

2010/0148591 A1*  6/2010  Lim ..................... H01R 13/655
                                                              307/125

* cited by examiner

*Primary Examiner* — Robert Deberadinis

(57) ABSTRACT

A power controller assembly is disclosed that transfers alternating current (AC) power generated by solar panels to devices coupled to the power controller assembly. The power controller assembly includes a power connector assembly that is coupled to an AC power outlet and transfers AC power generated by the solar panels from the AC power outlet to a power cord that is coupled to the power controller configuration. The power cord transfers the AC power to the device that consumes the AC power. The power controller assembly also includes an outlet power controller that controls the device that consumes the AC power based on instructions received from a communications device via wireless communication between the outlet power controller and the communications device.

20 Claims, 12 Drawing Sheets

SOLAR POWER CONTROLLER AND IMPEDANCE DETECTION

CROSS-REFERENCE TO RELATED APPLICATIONS

The present application is a continuation-in-part ("C-I-P") of and claims the benefit of U.S. patent application Ser. No. 15/095,949, filed Apr. 11, 2016, which was a continuation of U.S. Pat. No. 9,312,724, filed Sep. 12, 2014, which was a C-I-P of and claimed the benefits of U.S. patent application Ser. No. 14/264,891, filed Apr. 29, 2014, which was a C-I-P of and claimed the benefits of U.S. Pat. No. 9,444,397, filed Mar. 15, 2013, which claims the benefits of U.S. Patent Application No. 61/719,140, filed Oct. 26, 2012, U.S. patent application Ser. No. 14/264,891, filed Apr. 29, 2014, is also a C-I-P of and claims the benefits of International Application No. PCT/US14/28723, filed Mar. 14, 2014, which claimed the benefits of U.S. Patent Application No. 61/946,338, filed Feb. 28, 2014.

BACKGROUND

Field of Disclosure

The present disclosure relates generally to solar power energy generation, delivery, allocation and communication devices and to related computer software.

Related Art

Conventional solar panel systems have evolved from dependency on the collective conversion of solar energy to direct current ("DC") power to reliance on other power sources when conditions limit the collection of solar energy required to adequately support the conventional systems. For example, conventional solar panel systems may now provide alternative current ("AC") power when conditions warrant from a connection to an electric utility grid. Conventional solar panel systems that are grid tied use the AC power provided by the utility grid to power when conditions limit the collection of solar energy. Thus, modern conventional solar panel systems are no longer exclusively dependent on the DC power collected from the conversion of solar energy to adequately sustain the power needed.

Conventional solar panel systems can also increase their output power by daisy chaining additional conventional solar panels together. Conventional daisy chaining of conventional solar panels increases the overall AC output power when connected to the grid and receiving the AC power from the grid. Conventional daisy chaining of conventional solar panels also increases the overall DC output power when the conventional system is isolated from the grid and not receiving the AC power from the grid. Each of the principal components of the conventional solar panel systems is a separate entity and not included within a single housing. For example, a conventional solar panel system for a house will include conventional solar panels located on the roof of the house while the conventional battery system is located in the basement of the house, and the conventional inverter is located on the side of the house.

Conventional solar panel systems are limited to generating AC output power when the conventional system is connected to the grid and receiving the AC power generated by the grid. Conventional solar panel systems cannot generate AC power when isolated from the grid or cut off from the AC power generated by the grid. Conventional solar panel systems are limited to generating DC output power when isolated from the grid or cut off from the AC power generated by the grid. The DC output power is limited to DC power stored in batteries or DC power converted from solar energy. Further, the DC output power is inaccessible DC power in that the DC output power cannot be accessed from the conventional solar panel systems. For example, the conventional solar panel systems fail to include an AC output power outlet in which the AC output can be accessed.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

Figure 1:
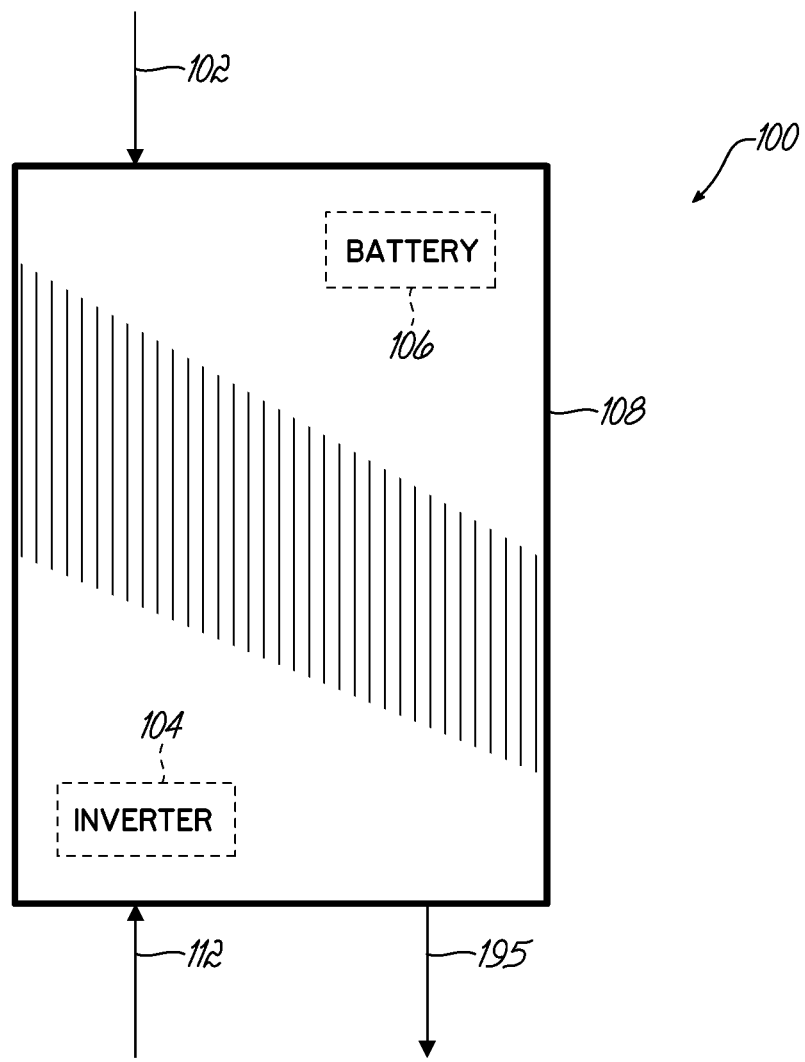
FIG. 1 is a top-elevational view of an exemplary solar panel according to an exemplary embodiment of the present disclosure.

The present disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," "an exemplary embodiment," an "example exemplary embodiment,"

etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions supplied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

FIG. 1 illustrates a top-elevational view of an exemplary solar panel according to an exemplary embodiment of the present disclosure. The solar panel 100 is configured to collect energy 102 from a light source, such as the sun, and convert that energy with an inverter 104 into DC power and if desired, store that power in a battery 106 or other power storage device. A solar panel 100 may additionally be a standalone AC power generating device by converting or inverting the DC power to AC power. However, the solar panel 100 is not limited to generating output AC power 195 by passing through input AC power 112 received from a utility grid into the output AC power 195 when the solar panel 100 is coupled to the utility grid. Rather, the solar panel 100 may still generate standalone output AC power 195 when isolated from the utility grid, i.e., not grid tied.

The solar panel 100 may also receive input AC power 112 that is generated by an electric utility grid when the solar panel 100 is coupled to the grid, i.e. when it is grid tied. In such cases, the solar panel 100 may parallel the AC output power 195 generated from the inverted DC power provided by a DC battery 106 with the input AC power 112 when the output AC power 195 is synchronized with the input AC power 112. The input AC power 112 may also be generated by a second solar panel 100 when it is coupled to a first solar panel 100, by an AC power generator, an AC power inverter, a sinusoidal AC power inverter, and/or any other type of AC power source independent from the solar panel 100 that will be apparent to those skilled in the relevant art(s) without departing from the spirit and scope of the disclosure.

The solar panel 100 may generate the output AC power 195 that is in parallel with the input AC power 112 when the output AC power 195 is synchronized with the input AC power 112. The solar panel 100 may sense the input AC power 112 when the solar panel 100 is coupled to a power source. The solar panel 100 may also sense the input AC power 112 when the solar panel 100 is coupled to the second solar panel and the second solar panel is providing the input AC power 112 to the solar panel 100.

The solar panel 100 may determine whether the input AC power 112 is synchronized with the output AC power 195 based on the power signal characteristics of the input AC power 112 and the output AC power 195. The power signal characteristics are characteristics associated with the sinusoidal waveform included in the input AC power 112 and the output AC power 195. The solar panel 100 may generate the output AC power 195 that is in parallel with the input AC power 112 when the power signal characteristics of the input AC power 112 are within a threshold of the power signal characteristics of the output AC power 195 so that the input AC power 112 and the output AC power 195 are synchronized. The solar panel 100 may refrain from generating the output AC power 195 that is in parallel with the input AC power 112 when the power signal characteristics of the input AC power 112 are outside the threshold of the power signal characteristics of the output AC power 195 where the input AC power 112 and the output AC power 195 are not synchronized.

For example, the solar panel 100 determines whether the input AC power 112 and the output AC power 195 are synchronized based on the frequency and the voltage of the sinusoidal waveform included in the input AC power 112 and the frequency and the voltage of the sinusoidal waveform included in the output AC power 195. The solar panel 100 generates the output AC power 195 that is in parallel with the input AC power 112 when the frequency and the voltage of the input AC power 112 are within the threshold of 10% from the frequency and the voltage of the output AC power 195 so that the input AC power 112 and the output AC power 195 are synchronized. The solar panel 100 refrains from generating the output AC power 195 that is in parallel with the input AC power 112 when the frequency and the voltage of the input AC power 112 are outside the threshold of 10% from the frequency and the voltage of the output AC power 195 where the input AC power 112 and the output AC power 195 are not synchronized. Rather, the solar panel 100 generates the output AC power 195 that is generated from the DC source and refrains from combining the output AC power 195 with the input AC power 112.

The power signal characteristics may include but are not limited to frequency, phase, amplitude, current, voltage and/or any other characteristic of a power signal that will be apparent to those skilled in the relevant art(s) without departing from the spirit and scope of the disclosure. The solar panel 100 may store the power signal characteristics of the input AC power 112. The threshold of the power signal characteristics associated with the input power as compared to the output power may be any threshold that prevents damage from occurring to the power converter 100 by combining the input AC power 112 and the output AC power 195 when the power signal characteristics of each significantly differ resulting in damage that will be apparent to those skilled in the relevant art(s) without departing from the spirit and scope of the disclosure.

In short, the output AC power 195 generated by the solar panel 100 may be used to power electronic devices external to the solar panel 100, such as a hairdryer, for example. The output AC power 195 may also be provided to another solar panel. The solar panel 100 may also convert the input AC power 112 to DC power and store the DC power within the solar panel 100. The solar panel 100 may continue to provide standalone output AC power 195 even after it is no longer receiving AC input power 112. Thus the solar panel 100 is not reliant on external sources to generate output AC power 195. For example, the solar panel 100 may continue to provide standalone output AC power 195 after it is no longer grid tied, or after it is no longer receiving AC input power 112 from another solar panel. For example, the solar panel 100 continues to provide output AC power 195 that is not in parallel with the input AC power 112 after the power converter 100 is no longer coupled to a power source such that the solar panel 100 is no longer receiving the input AC power 112 from the power source. In another example, the solar panel 100 continues to provide output AC power 195 that is not in parallel with the input AC power 112 after the solar panel 100 is no longer receiving the input AC power 112 from the second solar panel.

The solar panel 100 will also sense when it is no longer receiving AC input power 112. The solar panel 100 may then internally generate the standalone output AC power 195 from the previously stored DC power. For example, the solar panel 100 may have previously stored DC power that was converted from the input AC power 112 or that was converted from the solar energy 102.

The solar panel 100 may internally generate the output AC power 195 by converting the previously stored DC power into the output AC power 195. In one embodiment, the solar panel 100 may synchronize the power signal characteristics of the output AC power 195 that was converted from the previously stored DC power to be within the threshold of the power signal characteristics of the input AC power 112 despite no longer receiving the input AC power 112. For example, the solar panel 100 synchronizes the output AC power 195 that was converted from the previously stored DC power to have frequency and voltage that is within a threshold of 10% from the input AC power 112 when the solar panel 100 was receiving the input AC power 112. The solar panel 100 then provides the output AC power 195 when the solar panel 100 is no longer receiving the input AC power 112 while providing such output AC power 195 with frequency and voltage that is within the threshold of 10% from the previously received input AC power 112.

The solar panel 100 may be scalable in size and may be able to provide various levels of output power. For example, the solar panel 100 may be a portable model that may output approximately 250 W. In another example, the solar panel 100 may be a permanent rooftop model that may output 2.5 kW.

The solar panel 100 is also efficient in that it includes all of the components required to generate output AC power 195 within a single housing 108. For example, as will be discussed in more detail below, a solar power collector, a battery bank, a DC to AC converter, a controller, and other necessary components required to generate output AC power 195 are located within a single housing. This minimizes the amount of cabling required for the solar panel 100 so that transmission loss is minimized.

The solar panel 100 is also user friendly in that an individual may find that operating it requires relatively minimal effort. For example, as will be discussed in more detail below, the individual simply plugs in an external electrical device into the outlet provided on the solar panel 100 to power the external electrical device. In another example, the individual simply plugs in an additional solar panel into the outlet provided on the solar panel 100 to daisy chain the additional solar panel together. In yet another example, the solar panel 100 that is daisy chained to additional solar panels automatically establishes a master slave relationship so that the individual is not required to manually designate which is the master and the slave.

Figure 2:
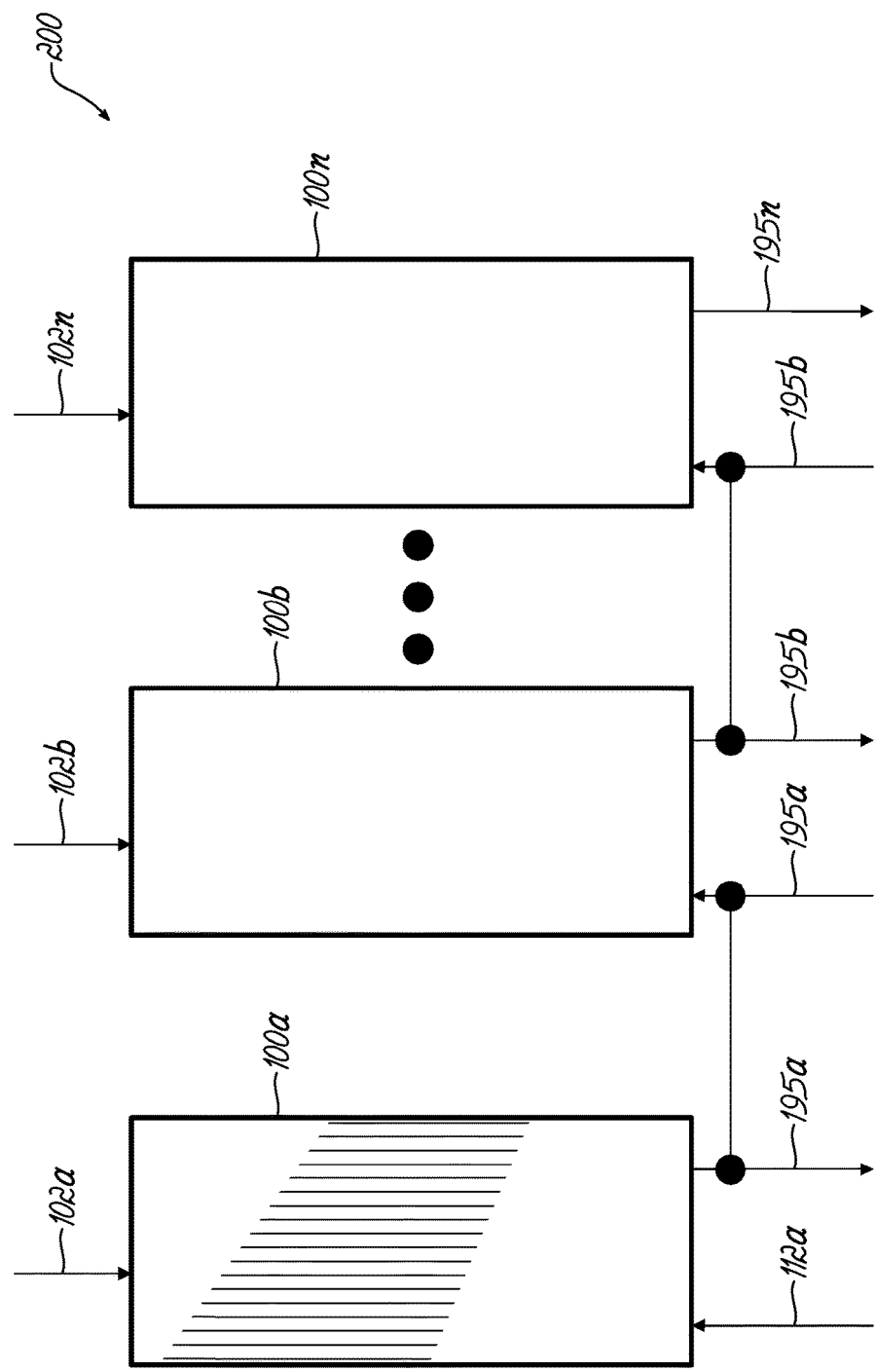
FIG. 2 is a top-elevational view of a solar panel configuration according to an exemplary embodiment of the present disclosure.

FIG. 2 illustrates a top-elevational view of a solar panel configuration according to an exemplary embodiment of the present disclosure. The solar panel configuration 200 represents a solar panel configuration that includes a plurality of solar panels 100a through 100n that may be daisy chained together to form the solar panel configuration 200, where n is an integer greater than or equal to two. Each solar panel 100a through 100n that is added to the solar panel configuration 200 may generate output AC power 195n that is in parallel with output AC power 195a, 195b. The solar panel configuration 200 shares many similar features with the solar panel 100 and as such, only the differences between the solar panel configuration 200 and the solar panel 100 will be discussed in further detail.

As noted above, the solar panel 100a generates output AC power 195a. However, the solar panel 100a is limited to a maximum output power level for the output AC power 195a. For example, the solar panel 100a may be limited to a maximum output power 195a level of 500 Watts ("W"). hence, regardless of the AC input power 112a level, the maximum output AC power 195a will be 500 W. Thus, if an individual desires, for example, to power a hair dryer that requires 1500 W to operate, the solar panel 100a will not be able to power it.

However, a user could daisy chain additional solar panels 100b through 100n together to parallel the output AC power 195a so that the overall output power of the solar panel configuration 200 is increased. In daisy chaining the plurality of solar panels 100a through 100n, each power input for each solar panel 100*b* through 100*n* is coupled to a power output of a solar panel 100*b* through 100*n* that is ahead of the solar panel 100*b* through 100*n* in the daisy chain configuration. For example, the power input of the solar panel 100*b* is coupled to the power output of the solar panel 100*a* so that the input AC power 195*a* received by the solar panel 100*b* is substantially equivalent to the output AC power 195*a* of the solar panel 100*a*. The power input of the solar panel 100*n* is coupled to the power output of the solar panel 100*b* so that the input AC power 195*b* received by the solar panel 100*n* is substantially equivalent to the output AC power 195*b* of the solar panel 100*b*.

After daisy chaining each of the plurality of solar panels 100(*a*-*n*), each output AC power 195(*a*-*n*) may be paralleled with each input AC power 112*a*, 112*b*, and/or 112*n* to increase the overall output AC power of the solar panel configuration 200. Each output AC power 195(*a*-*n*) may be paralleled with each input AC power 112*a*, 112*b*, and 112*n* so that the overall output AC power of the solar panel configuration 200 may be used to power the external electronic device that the individual requests to operate, such as the hair dryer. The individual may access the overall output AC power by coupling the external electronic device that the individual requests to power, such as the hair dryer, into any of the solar panels 100(*a*-*n*). The individual is not limited to coupling the external electronic device into the final solar panel 100*n* in the solar panel configuration 200 in order to access the overall output AC power. Rather, the individual may access the overall output AC power by coupling the external electronic device to any of the solar panels 100(*a*-*n*) in the solar panel configuration 200.

For example, if the maximum output AC power 195*a* for the solar panel 100*a* is 500 W, the maximum output power that can be generated by the solar panel 100*b* is also 500 W. The maximum output power that can be generated by the solar panel 100*n* is also 500 W. However, the solar panel 100*b* is daisy chained to the solar panel 100*a* and the solar panel 100*b* is daisy chained to the solar panel 100*n*. As a result, the external input AC power 112*a*, 112*b*, and 112*n* for each of the solar panels 100(*a*-*n*) is in parallel with the output AC power 195*a*, 195*b*, and 195*n* for each of the solar panels 100(*a*-*n*).

The output AC power 195*a*, 195*b*, and 195*n* for each of the solar panels 100(*a*-*n*) is 500 W. The solar panel 100*b* generates the output AC power 195*b* of 500 W in parallel with the input AC power 112*b* of 500 W so that the output AC power 195*b* and/or the output AC power 195*a* is the paralleled AC output power of 1000 W when the solar panel 100*b* is daisy chained to the solar panel 100*a*. The solar panel 100*n* is then daisy chained to the solar panels 100*a* and 100*b* so that the output AC power 195*a*, the output AC power 195*b* and/or the output AC power 195*n* is the paralleled AC output power of 1500 W. Thus, the maximum output AC power for the solar panel configuration 200 is 1500 W. The maximum output AC power of 1500 W is now sufficient to power the hair dryer that requires 1500 W to operate.

The individual may plug the hair dryer into any of the solar panels 100(*a*-*n*) in order to access the maximum output AC power of 1500 W generated by the solar panel configuration 200 to power the hair dryer. The individual is not limited to plugging the hair dryer into the solar panel 100*n* simply because the solar panel 100*n* is the last solar panel in the daisy chain of the solar panel configuration 200. The daisy chaining of each of the plurality of solar panels 100(*a*-*n*) when the plurality of solar panels 100(*a*-*n*) are not coupled to a power source but generating paralleled output AC power may be considered a standalone solar panel micro grid.

Each of the solar panels 100*a* through 100*n* included in the solar panel configuration 200 may operate in a master/slave relationship with each other. The master is the originator of the standalone AC power for the solar panel configuration 200. The master determines the power signal characteristics of the standalone AC power originated by the master in that each of the remaining slaves included in the solar panel configuration 200 are required to accordingly synchronize each of their own respective AC output powers. Each respective AC power output that is synchronized to the master standalone AC is paralleled with the master standalone AC power for the master. For example, the utility grid is the master of the solar panel configuration 200 when the utility grid is the originator of the input AC power 112*a* provided to solar panel 100*a*. The utility grid determines the frequency, phase, amplitude, voltage and current for the input AC power 112*a*. Each solar panel 100*a* through 100*n* then become a slave and synchronizes each of their respective output AC power 195*a* through 195*n* to have substantially equivalent frequency, phase, amplitude, and current as the input AC power 112*a*. Each output AC power 195*a* through 195*n* that is synchronized with input AC power 112*a* is paralleled with the input AC power 112*a*.

Each of the solar panels 100*a* through 100*n* operates as a slave for the solar panel configuration 200 when each of the solar panels 100*a* through 100*n* is receiving input AC power. Each of the solar panels 100*a* through 100*n* operates as a master when each of the solar panels 100*a* through 100*n* no longer receives input AC power. For example, each of the solar panels 100*a* through 100*n* operate as the slave when the solar panel configuration 200 is grid tied so that the utility grid operates as the master for the solar panel configuration 200. Each solar panel 100*a* through 100*n* receives input AC power from either the grid or its adjacent panel. Solar panel 100*a* is receiving the input AC power 112*a* from the grid making solar panel 100*a* the slave while solar panel 100*b* receives the input AC power 195*a* from solar panel 100*a* making solar panel 100*b* the slave, etc.

In another example, solar panel 100*a* operates as the master for the solar panel configuration 200 when the solar panel configuration 200 is no longer grid tied and solar panel 100*a* is generating standalone output AC power 195*a*. Each of the solar panels 100*b* through 100*n* then receives input AC power via the standalone output AC power 195*a* internally generated by the master solar panel 100*a*. Solar panel 100*b* receives input AC power 195*a* from solar panel 100*a* and solar panel 100*c* receives the input AC power 195*b* from the solar panel 100*b*.

The solar panel configuration 200 may automatically transition the master/slave designations between each of the solar panels 100*a* through 100*n* without user intervention. As noted above, any solar panel 100*a* through 100*n* may be designated as the master of the solar panel configuration 200 when it no longer receives input AC power. And the master solar panel will automatically transition to a slave when it senses input AC power coming into it. At that point, the master solar panel automatically terminates its internal standalone output AC power generation from its own previously stored DC power That solar panel then automatically synchronizes to the power signal characteristics of the input AC power it now receives to parallel the output AC power provided by the new master solar panel and begin operating as a slave by generating output AC power it now receives.

For example, when solar panel 100*b* operates as a master, the solar panel 100*b* is not receiving input AC power but rather is internally generating its own standalone output AC power 195*b* from its own previously stored DC power. The solar panel 100*b* continues to operate as the master until the solar panel 100*b* senses that input AC power 195*a* is being received by it from the solar panel 100*a*, which is generating the input AC power 195*a*. The solar panel 100*b* then automatically terminates internally generating its own standalone output AC power 195*b* from its own previously stored DC power, and automatically synchronizes the standalone output AC power 195*b* to the frequency, phase, amplitude, and current of the input AC power 195*a*. In other words the solar panel 100*b* transitions to being a slave when the solar panel 100*b* generates the output AC power 195*b* from the input AC power 195*a* rather than from its own previously stored DC power.

The solar panel configuration 200 may also automatically transition the slave solar panels 100*a* through 100*n* to being a master without user intervention. As noted above, solar panels 100*a* through 100*n* may be designated as slaves when they are receiving input AC power. However, they may automatically transition to being a master when they no longer sense input AC power coming into them. At that point, they automatically begin internally generating their own standalone output AC power from their own previously stored DC power. The solar panels 100*a* through 100*n* may also have stored the power signal characteristics of the input power previously received by them and may automatically synchronize their own standalone output AC power to these characteristics. Again the solar panels 100*a* through 100*b* transitions from a slave to a master when they begin to internally generate their own standalone output AC power from their own previously stored DC power.

After the master-slave relationship is established between each of the master solar panels 100(*a-n*), the paralleled output AC power of the master solar panel configuration 200 may be maintained by the solar panel converter 100*a* and each of the slave solar panels 100(*b-n*). The master solar panel 100*a* may maintain the voltage of the paralleled output AC power while the slave solar panels 100(*b-n*) provide the current to maintain the voltage of the paralleled output AC power at a reference voltage.

However, the voltage of the paralleled output AC power may decrease when the external electronic device the individual requests to power, such as the hair dryer, is coupled to at least one of the outputs for the solar panels 100(*a-n*). Each of the slave solar panels 100(*b-n*) may increase the current of the paralleled output AC power so that the voltage of the paralleled output AC power maintained by the master solar panel 100*a* is increased back to the reference voltage sufficient to generate the paralleled output AC power. The reference voltage of the paralleled output AC power is the voltage level that is to be maintained to generate the paralleled output AC power that is sufficient to power the external electronic device. The reference voltage may be specified to be any voltage that is sufficient to maintain the paralleled output AC power that will be apparent to those skilled in the relevant art(s) without departing from the spirit and scope of the disclosure.

Each of the slave solar panels 100(*b-n*) may continue to generate current sufficient to maintain the voltage of the paralleled output AC power at the reference voltage so that the external electronic device is powered by the paralleled output AC power. However, eventually each of the slave solar panels 100(*b-n*) may have their DC sources depleted to the point where each of the slave solar panels 100(*b-n*) no longer has current that is sufficient to maintain the voltage of the paralleled output AC power at the reference voltage sufficient to generate the paralleled output AC power. At that point, the master solar panel 100*a* may begin to provide current to maintain the voltage of the paralleled output AC power at the reference voltage sufficient to generate the paralleled output AC power.

The solar panel configuration 200 may continue to generate output AC power even when a particular slave solar panel 100*a* through 100*n* may no longer be functional. In such cases, the dysfunctional slave solar panel 100*a* through 100*n* continues to pass through the standalone output AC power generated by the master solar panel 100*a* through 100*n* to each of the other slave solar panels 100*a* through 100*n*. For example, when the master solar panel 100*a* acts as the master and the solar panels 100*b* and 100*n* act as the slaves, if the slave solar panel 100*b* fails and is no longer functional, it will continue to pass through the output standalone AC power 195*a* generated by the master solar panel 100*a* to the functional slave solar panel 100*n* so that the other functional slave solar panel 100*n* may continue to generate output AC power 195*n* from the standalone output AC power 195*a*.

Figure 3:
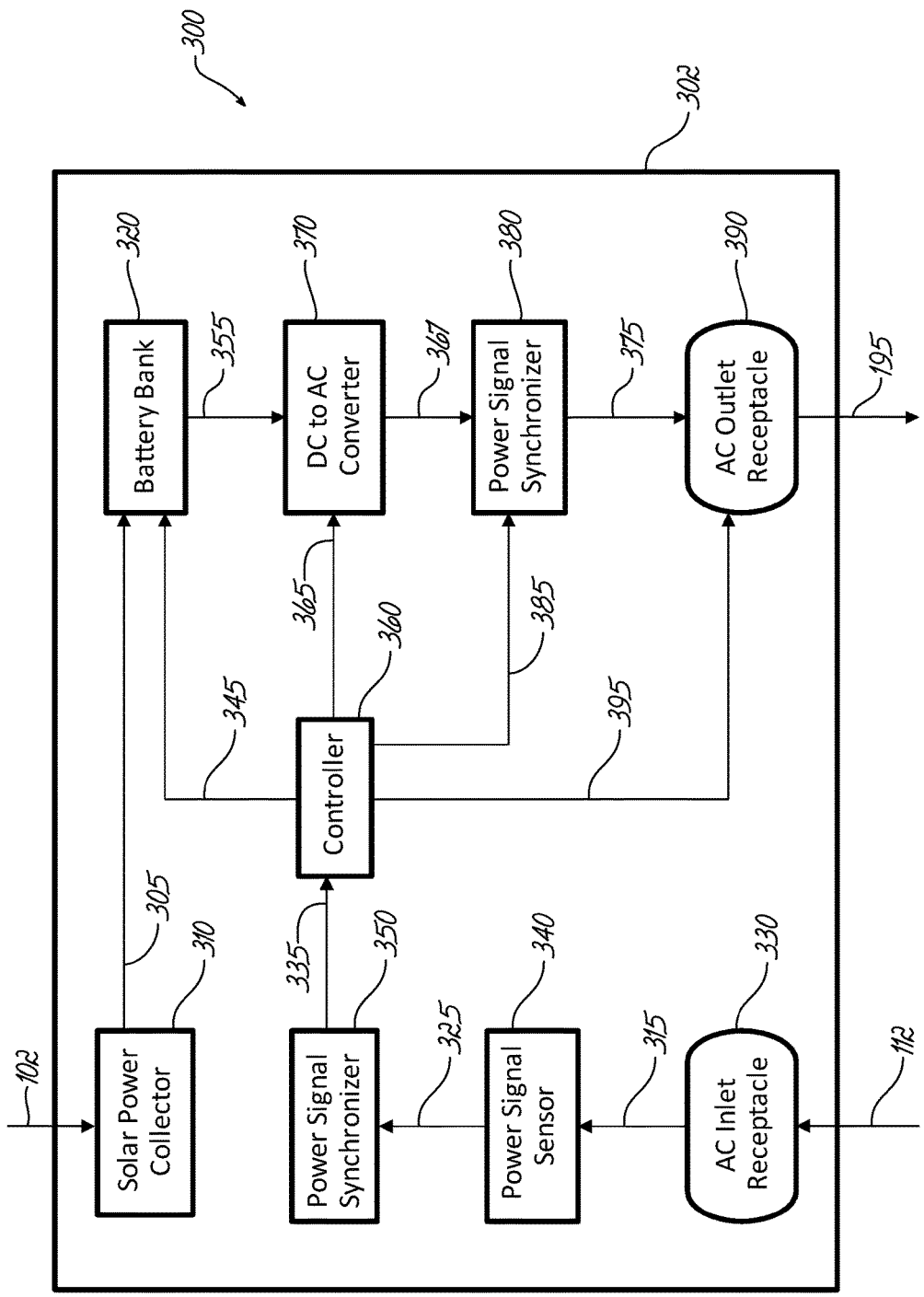
FIG. 3 is a block diagram of an exemplary solar panel that may be used in the solar panel configuration according to an exemplary embodiment of the present disclosure.

FIG. 3 is a block diagram of another exemplary solar panel 300 that may be used in the solar panel configuration 200 according to an exemplary embodiment of the present disclosure. Although FIG. 3 depicts a block diagram of the solar panel 300, FIG. 3 may also depict a block diagram of one of the plurality of solar panels 100*a* through 100*n* used in the solar panel configuration 200 depicted in FIG. 2 as well as the single solar panel 100 depicted in FIG. 1 Solar panel 300 will also automatically transition to internally generating standalone output AC power 195 based on the stored DC power 355 provided by the battery bank 320 when the power signal sensor 340 no longer senses the received input AC power 315. The solar panel 300 will also automatically transition to operating as a master when the power signal sensor 340 no longer senses the received input AC power 315. Solar panel 300 will also automatically transition to operating as a slave when the power signal sensor 340 begins to sense the received input AC power 315.

Enclosed within a single housing 302 for solar panel 300 is a solar power collector 310, a battery bank 320, an AC inlet receptacle 330, a power signal sensor 340, a power signal synchronizer 350, a controller 360, a DC to AC converter 370, a power signal synchronizer 380, and an AC outlet receptacle 390.

The solar panel collector 310 captures the solar or other light energy 102 from a solar or light source, e.g., the sun. The solar panel collector 310 may include a single and/or multiple photovoltaic ("PV") solar panels or arrays that convert the solar energy 102 into the captured DC power 305. The solar panel collector 310 captures solar energy 102 when the solar source is available and is radiating solar energy 102 in a sufficient manner for the solar panel collector 310 to capture. The solar panel collector 310 converts the solar energy 102 into DC captured power 305 in a wide range of voltages and/or current capacities. The solar panel collector 310 may include photovoltaic solar panels categorized as, but not limited to, mono-crystalline silicon, polycrystalline silicon, amorphous silicon, cadmium telluride, copper indium selenide, thin-film layers, organic dyes, organic polymers, nanocrystals and/or any other type of photovoltaic solar panels that will be apparent to those skilled in the relevant art(s) without departing from the spirit and scope of the disclosure. The solar panel collector 310 may also be any shape or size that is sufficient to capture the solar energy 102 that will be apparent to those skilled in the relevant art(s) without departing from the spirit and scope of the disclosure.

The battery bank 320 receives and stores the captured DC power 305. The battery bank 320 accumulates the captured DC power 305 as the captured DC power 305 is generated. The battery bank 320 may accumulate the captured DC power 305 until the battery bank 320 is at capacity and can no longer store any more of the captured DC power 305. The battery bank 320 may also store the AC input power 112 that is converted to the captured DC power 305 when the AC output receptacle 390 is not generating the output AC power 195. The battery bank 320 stores the captured DC power 305 until requested to provide the stored DC power 355. The stored DC power 355 provided by the battery bank 320 may include low-voltage but high energy DC power. The battery bank 320 may include one or more lithium ion phosphate (LiFePO$_4$) and/or one or more lead acid cells. However, this example is not limiting, those skilled in the relevant art(s) may implement the battery bank 320 using other battery chemistries without departing from the scope and spirit of the present disclosure. One or more cells of the battery bank 320 convert chemical energy into electrical energy via an electromechanical reaction.

As noted above, the solar panel 300 may automatically transition between the master and/or slave designations without user intervention. The solar panel 300 will operate as a slave when the AC inlet receptacle 330 is receiving AC input power 112, such as AC power that is generated by the grid. The AC inlet receptacle 330 may also receive input AC power 112 when the AC inlet receptacle 330 is grid tied, such as AC power generated by a second solar panel when two panels are coupled together. The input AC power 112 may also be AC power generated by an AC power generator, an AC power inverter, or any other type of AC power source independent from the solar panel 300 that will be apparent to those skilled in the relevant art(s) without departing from the spirit and scope of the disclosure.

The AC inlet receptacle 330 may be in the form of a male configuration or a female configuration. A male AC inlet receptacle 330 prevents an individual from mistakenly plugging an electronic device into it with the intent to power the electronic device, as electronic devices typically have male plugs. The AC inlet receptacle 330 may also be fuse protected. The AC inlet receptacle 330 may also be configured to receive the input AC power 112 in American, European, and/or any other power format that will be apparent to those skilled in the relevant art(s) without departing from the spirit and scope of the disclosure. The AC inlet receptacle 330 may further include an Edison plug, any of the several International Electrotechnical Commission ("IEC") plugs, or any other type of plug that will be apparent to those skilled in the relevant art(s) without departing from the spirit and scope of the disclosure.

The AC inlet receptacle 330 provides received input AC power 315 to a power signal sensor 340. The power signal sensor 340 senses whether the solar panel 300 is receiving input AC power 112 through the AC inlet receptacle 330 based on whether it receives input AC power 315 from the AC inlet receptacle 330. Once the power signal sensor 340 senses the received input AC power 315, the power signal sensor 340 generates an incoming AC power signal 325. The incoming AC power signal 325 provides information regarding power signal characteristics of the input AC power 112 that the solar panel 300 is receiving through the AC inlet receptacle 330. These power signal characteristics may include, but are not limited to, frequency, phase, amplitude, current, voltage, and other like characteristics of power signals that will be apparent to those skilled in the relevant art(s) without departing from the spirit and scope of the disclosure.

The power signal sensor 340 provides the incoming AC power signal 325 to a power signal synchronizer 350. The power signal synchronizer 350 determines the power signal characteristics of the input AC power 112 that are provided by the incoming AC power signal 325. For example, the power signal synchronizer 350 determines the frequency, phase, amplitude, voltage, and current of the input AC power 112. The power signal synchronizer 350 generates a synchronized input power signal 335 that provides the power signal characteristics of the input AC power 112 to a controller 360.

The power signal synchronizer 350 also synchronizes the converted AC power 367 that is generated by the DC to AC converter 370 with the power signal characteristics of the input AC power 112. The power signal synchronizer 350 determines whether the power signal characteristics of the input AC power 112 are within the threshold of the power signal characteristics of the converted AC power 367. The power signal synchronizer 350 synchronizes the input AC power 112 with the converted AC power 367 when the power signal characteristics of the input AC power 112 are within the threshold of the power signal characteristics of the converted AC power 367. The power signal synchronizer 350 refrains from synchronizing the input AC power 112 with the converted AC power 367 when the power signal characteristics of input AC power 112 are outside the threshold of the power signal characteristics of the converted AC power 367.

For example, the power signal synchronizer 350 determines whether the frequency and the voltage of the sinusoidal waveform included in the input AC power 112 are within a threshold of 10% from the frequency and the voltage of the sinusoidal waveform included in the converted AC power 367. The power signal synchronizer 350 synchronizes the input AC power 112 with the converted AC power 367 when the frequency and the voltage of the input AC power 112 are within the threshold of 10% from the frequency and the voltage of the converted AC power 367. The power signal synchronizer 350 refrains from synchronizing the input AC power 112 with the converted AC power 367 when the frequency and the voltage of the input AC power 112 are outside the threshold of 10% from the frequency and the voltage of the converted AC power 367.

The output AC power 195 includes the input AC power 112 in parallel with the converted AC power 367 when the converted AC power 367 is synchronized with the input AC power 112. For example, the power signal synchronizer 350 synchronizes the converted AC power 367 to operate at within the threshold of 10% from the frequency and voltage of the input AC power 112. In one embodiment, the input AC power 112 embodies a substantially pure sinusoidal waveform. The substantially pure sinusoidal waveform may represent an analog audio waveform which is substantially smooth and curved rather than a digital audio waveform that includes squared off edges. In such an embodiment, the power signal synchronizer 350 synchronizes the converted AC power 367 to be within a threshold of the pure sinusoidal waveform embodied by the input AC power 112. After the power signal synchronizer 350 synchronizes the converted AC power 367 to the power signal characteristics of the input AC power 112, the power signal synchronizer 350 notifies the controller 360 of the synchronization via the synchronized input power signal 335.

The controller 360 receives the synchronized input power signal 335. The controller 360 determines the power signal characteristics of the input AC power 112 and then stores the power signal characteristics in a memory included in the controller 360. For example, the controller 360 stores the frequency, phase, amplitude, voltage, and/or current of the input AC power 112. After receiving the synchronized input power signal 335, the controller 360 is aware that the input AC power 112 is coupled to the AC inlet receptacle 330. In response to the input AC power 112 coupled to the AC inlet receptacle 330, the controller 360 stops generating a reference clock for the solar panel 300.

Also, in response to the input AC power 112 coupled to the AC inlet receptacle 330, the controller 360 also generates a battery bank signal 345. The controller 360 instructs the battery bank 320 via the battery bank signal 345 to no longer provide stored DC power 355 to the DC to AC inverter 370. The instruction by the controller 360 to the battery bank 320 to no longer provide stored DC power 355 to the DC to AC inverter 370 also terminates the standalone output AC power 195 that is generated from the stored DC power 355.

Further, in response to the input AC power 112 coupled to the AC inlet receptacle 330, the controller 360 confirms that the power signal synchronizer 350 has synchronized the converted AC power 367 to the power signal characteristics of the input AC power 112. After confirming that the power signal synchronizer 350 has synchronized the converted AC power 367 to the power signal characteristics of the input AC power 112, the controller 360 links in parallel the input AC power 112 being received by the AC inlet receptacle 330 with the converted AC power 367 to the AC outlet receptacle 390 to generate parallel AC power 195. The AC outlet receptacle 390 then outputs the output AC power 195 that includes the input AC power 112 in parallel with the converted AC power 367 with power signal characteristics that are substantially equivalent to the power signal characteristics of the input AC power 112. For example, the frequency, phase, amplitude, voltage, and/or current of the output AC power 195 may be substantially equivalent to the frequency, phase, amplitude, voltage, and/or current of the input AC power 112.

The AC outlet receptacle 390 may be in the form of a male or a female configuration. A female AC outlet receptacle 390 allows an individual to directly plug an electronic device into it as electronic devices typically have male plugs.

The AC outlet receptacle 390 may also be fuse protected. The AC outlet receptacle 390 may be configured to provide the output AC power 195 in American, European, or any other power format that will be apparent to those skilled in the relevant art(s) without departing from the spirit and scope of the disclosure. The AC outlet receptacle 390 may also include an Edison plug, any of the IEC plugs, or any other type of plug that will be apparent to those skilled in the relevant art(s) without departing from the spirit and scope of the disclosure.

As noted above, the solar panel 300 will automatically transition between the master and/or slave designations without user intervention. The solar panel 300 will automatically transition from operating as a slave to operating as a master when the AC input power signal 112 diminishes and is no longer received by the AC inlet receptacle 330 such that the controller 360 no longer receives the synchronized input power signal 335. At that point, the controller 360 generates the battery bank signal 345 to instruct the battery bank 320 to begin generating stored DC power 355. The controller 360 generates a power conversion signal 365 to instruct the DC to AC converter 370 to convert the stored DC power 355 to converted AC power 367. The converted AC power 367 is high-voltage AC output power. The DC to AC converter 370 may use high frequency modulation in converting the stored DC power 355 to the converted AC power 367.

The controller 360 then provides a synchronized output power signal 385 to the power signal synchronizer 380. The synchronized output power signal 385 provides the power signal characteristics of the input AC power 112 when the input power signal 112 is coupled to the AC inlet receptacle 330 to the power signal synchronizer 380. For example, the synchronized output power signal 385 provides the frequency, phase, amplitude, voltage, and current of the input power signal 112 to the power signal synchronizer 380. The synchronized output power signal 385 also provides the reference clock to the power signal synchronizer 380.

The power signal synchronizer 380 then generates synchronized output AC power 375 by synchronizing the converted AC power 367 to the power signal characteristics of the input AC power 112 and the reference clock provided by the synchronized output power signal 385. In one embodiment, the input AC power 112 embodies a substantially pure sinusoidal waveform. In such an embodiment, the power signal synchronizer 380 synchronizes the converted AC power 367 to be within the threshold of the pure sinusoidal waveform embodied by the input AC power 112. The synchronized output AC power 375 includes power signal characteristics that are within the threshold of the power signal characteristics of the input AC power 112. For example, the synchronized output AC power 375 includes a frequency and voltage that is within the threshold of the frequency and voltage of the input AC power 112. The AC outlet receptacle 390 then generates the output AC power 195 based on the synchronized output power 375. Thus, the power converter 300 generates the output AC power 195 that is substantially similar to the input AC power 112 despite not receiving the input AC power 112 from other sources.

Figure 4A:
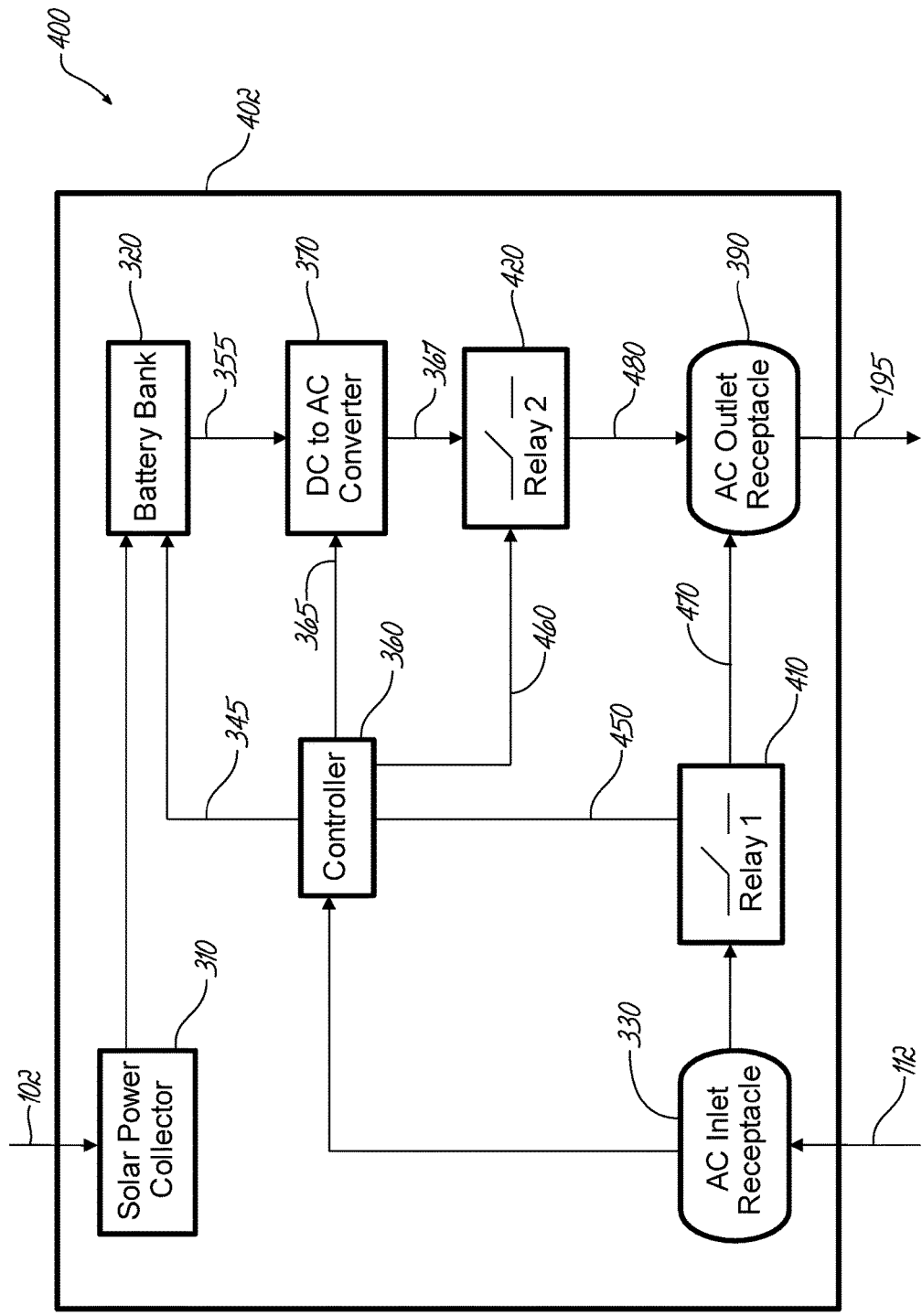
FIG. 4A is a block diagram of an exemplary solar panel that may be used in the solar panel configuration according to an exemplary embodiment of the present disclosure.

FIG. 4A is a block diagram of another exemplary solar panel 400 that may be used in the solar panel configuration 200 according to an exemplary embodiment of the present disclosure. Although, FIG. 4A depicts a block diagram of the solar panel 400, FIG. 4A may also depict a block diagram of one of the plurality of panels 100a through 100n used in the solar panel configuration 200 depicted in FIG. 2 and also the single solar panel 100 depicted in FIG. 1. The features depicted in the block diagram of the solar panel 300 may also be included in the solar panel 400 but have been omitted for simplicity.

The solar panel 400 may automatically transition from operating as a master and operating as a slave without user intervention based on a relay configuration. The solar panel 400 may be implemented using the solar power collector 310, the battery bank 320, the AC inlet receptacle 330, the controller 360, the DC to AC converter 370, the AC outlet receptacle 390, a first relay 410 and a second relay 420 each of which is enclosed within a housing 402 for the solar panel 400.

As noted above, the solar panel 400 operates as a slave when the controller 360 senses that the input AC power 112 is coupled to the AC inlet receptacle 330. The controller then terminates the generation of the standalone output AC power 195. The solar panel 400 operates as a master when the controller 360 no longer senses that the input AC power 112 is coupled to the AC inlet receptacle 330. The controller 360 then instructs the battery bank 320 and the DC to AC inverter 370 to begin generating the standalone output AC power 195. The relay configuration that includes a first relay 410 and a second relay 420 transitions the solar panel 400 between the master and slave modes based on the logic provided in Table 1.

TABLE 1

| Master Mode | Relay 1 Open | Relay 2 Closed |
| Slave Mode | Relay 1 Closed | Relay 2 Closed |
| Unit Power Off (Bypassed) | Relay 1 Closed | Relay 2 Open |

When automatically transitioning from the slave mode to the master mode, the controller 360 no longer senses the input AC power 112 coupled to the AC inlet receptacle 330. At this point, the controller 360 generates a first relay signal 450 that instructs the first relay 410 transition to the open state (logic 0). The controller 360 also generates a second relay signal 460 that instructs the second relay 420 to transition to the closed state (logic 1). The controller 360 also generates battery bank signal 345 that instructs the battery bank 320 to begin providing the stored DC power 355 to the DC to AC converter 370 to generate the converted AC power 367. Because the second relay 420 is in the closed position (logic 1), the converted AC power 367 passes through the second relay 420, and as shown by arrow 480, onto the AC outlet receptacle 390 so that the solar panel 400 provides the AC output power 195 generated from the stored DC power 355 rather than the input AC power 112. The open state (logic 0) of the first relay 410 prevents any remaining input AC power 112 from reaching the AC output receptacle 390 when the solar panel 400 is generating the standalone AC output power 195 as operating as the master.

Once the controller 360 senses the input AC power 112 coupled to the AC inlet receptacle 330, the controller 360 automatically generates the power conversion signal 365 to instruct the DC to AC converter 370 to no longer provide converted AC power 367 so that the solar panel 400 no longer generates the standalone AC output power 195. The controller 360 also automatically generates the second relay signal 460 to instruct the second relay 420 to transition to the open state (logic 0). The controller 360 also generates the first relay signal 450 to instruct the first relay 410 to transition to the closed state (logic 1). After the second relay 420 transitions to the open state (logic 0) and the first relay 410 transitions to the closed state (logic 1), any input AC power 112 coupled to the AC inlet receptacle 330 passes through the first relay 410, and as shown by arrow 470, onto the AC outlet receptacle 390 so that the solar panel 400 generates the output AC power 195.

The second relay 420 remains in the open state (logic 0), until the controller 360 has successfully synchronized the solar panel 400 to the input AC power 112 coupled to the AC inlet receptacle 330. After the controller 360 properly synchronizes solar panel 400 to the input AC power the controller 360 then generates the second relay signal 460 to instruct the second relay 420 to transition from the open state (logic 0) to the closed state (logic 1). After the second relay 420 transitions from the open state (logic 0) to the closed state (logic 1), the solar panel 400 will generate output AC power 195 that includes the converted AC power 367 that is in parallel to the input AC power 112.

The solar panel 400 also operates in a bypass mode. In the bypass mode, the solar panel 400 is powered off and is no longer functioning. In embodiment, the controller 360 generates the first relay signal 450 and instructs the first relay 410 to transition into the closed state (logic 1). The controller 360 also generates the second relay signal 460 and instructs the second relay 420 to transition into the open state (logic 0). In another embodiment, the first relay 410 and the second relay 420 are spring loaded relay switches. When the solar panel 400 powers off, the electromagnetic coil of the first relay 410 is no longer energized so the spring pulls the contacts in the first relay 410 into the up position. The closing of the first relay 410 and the opening of the second relay 420 cause the solar panel 400 to be a pass through where the input AC power 112 passes through the solar panel 400 and onto a second solar panel daisy chained to the solar panel 400 and/or to an electronic device being powered by the input AC power 112. Thus, additional solar panels and/or electronic devices down the line from the dysfunctional solar panel 400 continue to operate off of the input AC power 112. The first relay 410 and the second relay 420 may be implemented in hardware, firmware, software, or any combination thereof that will be apparent to those skilled in the relevant art(s) without departing from the spirit and scope of the disclosure.

Figure 4B:
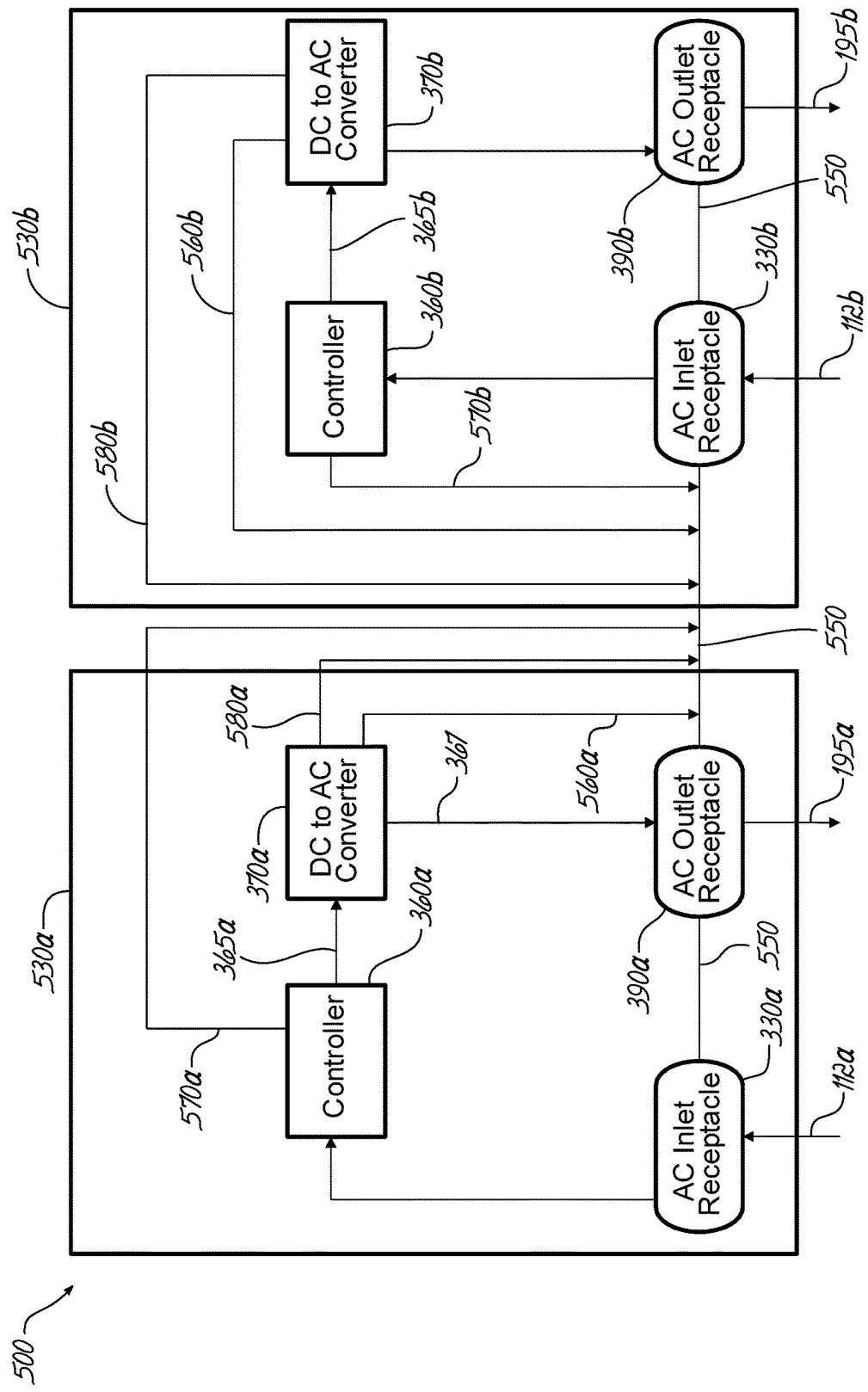
FIG. 4B is a block diagram of an exemplary solar panel that may be used in the solar panel configuration according to one exemplary embodiment of the present disclosure.

FIG. 4B is a block diagram of another exemplary solar panel configuration 500 according to an exemplary embodiment of the present disclosure. Although, FIG. 4B depicts a block diagram of the solar panel configuration 500, FIG. 4B may also depict a block diagram of the plurality of solar panels 100(a-n) used in the solar panel configuration 200 depicted in FIG. 2.

The solar panel configuration 500 may be implemented using the master solar panel 530a and the slave solar panel 530b. The master solar panel 530a includes a master AC inlet receptacle 330a, a master AC outlet receptacle 390a, a master controller 360a, and a master DC to AC converter 370a. The slave solar panel 530b includes a slave AC inlet receptacle 330b, a slave AC outlet receptacle 390b, a slave controller 360b, and a slave DC to AC converter 370b. The master solar panel 530a and the slave solar panel 530b are coupled together by the AC bus 550. The master solar panel 530a and the slave solar panel 530b share many similar features with the solar panel 100, the plurality of solar panels 100(a-n), the solar panel 300, and the solar panel 400; therefore, only the differences between the solar panel configuration 500 and the solar panel 100, the plurality of solar panels 100(a-n), the solar panel 300, and the solar panel 400 will be discussed in further detail.

As mentioned, the solar panel 530a operates as the master and the solar panel 530b operates as the slave. However, as discussed in detail above, the solar panels 530a and 530b may operate as either the master or slave depending on whether input AC power is applied to the respective AC inlet receptacle of each. The master solar panel 530a may apply a constant voltage to an AC bus 550 that is coupling the AC inlet receptacle 330a and the AC outlet receptacle 390a of the master solar panel 530a to the AC inlet receptacle 330b and the AC outlet receptacle 390b of the slave solar panel 530b to maintain the paralleled output AC power generated by the solar panel configuration 500. The slave solar panel 530b may increase the current applied to the AC bus 550 when the voltage of the AC bus 550 decreases below the reference voltage due to an external electronic device being coupled to the solar panel configuration 500. The slave solar panel 530b may increase the current applied to the AC bus 550 so that the voltage of the AC bus 550 is increased back to the reference voltage so that the paralleled output AC power is maintained to adequately power the external electronic device.

After the master solar panel 530a has synchronized with the slave solar panel 530b, the external input AC power 112a is in parallel with the output AC power 195a and the output AC power 195*b* generating the paralleled output AC power. The paralleled output AC power may be accessed by coupling the external electronic device to the master AC outlet receptacle 390*a* and/or the slave AC outlet receptacle 390*b*. The AC bus 550 may provide an access point to the paralleled output AC power for the master controller 360*a* and the slave controller 360*b* to monitor.

The master controller 360*a* may initially instruct the master DC to AC converter 370*a* with a master power conversion signal 365*a* to provide a constant master voltage 560*a* to the AC bus 550 to maintain the paralleled output AC power at a specified level. The specified level may be the maximum output AC power that may be generated by the power converter configuration 500 with the external input AC power 112*a* in parallel with the output AC power 195*a* and the output AC power 195*b*. However, the specified level may be lowered based on the constant master voltage 560*a* supplied by the master DC to AC converter 370*a* to the AC bus 550. The specified level may be associated with the reference voltage of the paralleled output AC power. As noted above, the reference voltage of the paralleled output AC power is the voltage level that is to be maintained to generate the paralleled output AC power that is sufficient to power the external electronic device.

After an external electronic device is coupled to the master AC outlet receptacle 390*a* and/or the slave AC outlet receptacle 390*b*, the paralleled output AC power may temporarily decrease due to the load applied to the AC bus 550 by the external electronic device. The slave controller 360*b* may monitor the AC bus 550 with a slave AC bus monitoring signal 570*b* to monitor the voltage of the AC bus 550 to determine whether the voltage has decreased below the reference voltage of the AC bus 550 which in turn indicates that the paralleled output AC power has decreased below the specified level. The slave controller 360*b* may then instruct the slave DC to AC converter 370*b* with a slave power conversion signal 365*b* to increase the slave current 580*b* that is provided to the AC bus 550 when the slave controller 360*b* determines that the voltage of the AC bus 550 decreases after the external electronic device is coupled to the master AC outlet receptacle 390*a* and/or the slave AC outlet receptacle 390*b*. The slave current 580*b* may be increased to a level sufficient to increase the voltage of the AC bus 550 back to the reference voltage. Increasing the voltage of the AC bus 550 back to the reference voltage also increases the paralleled output AC power so that the paralleled output AC power is reinstated to the specified level with a minimal lapse in time. The maintaining of the paralleled output AC power at the specified level prevents a delay in the powering of the external electronic device.

The slave controller 360*b* may continue to monitor voltage of the AC bus 550 with the slave AC bus monitoring signal 570*b* to ensure that the voltage of the AC bus 550 does not decrease below the reference voltage. The slave controller 360*b* may continue to instruct the slave DC to AC converter 370*b* with the slave power conversion signal 365*b* to increase or decrease the slave current 580*b* accordingly based on the voltage of the AC bus 550 to maintain the paralleled output AC power at the specified level.

The slave DC to AC converter 370*b* may continue to provide the slave current 580*b* to the AC bus 550 until the slave DC to AC converter 370*b* no longer has the capability to provide the slave current 580*b* at the level necessary to maintain the voltage of the AC bus 550 at the reference voltage. For example, the slave DC to AC converter 370*b* may continue to provide the slave current 580*b* to the AC bus 550 until the DC source of the slave power converter 530*b* is drained to the point where the slave DC to AC converter 370*b* can no longer provide the slave current 580*b* at the level sufficient to maintain the voltage of the AC bus 550 at the reference voltage.

The master controller 360*a* also monitors the AC bus 550 with a master AC bus monitoring signal 570*a*. The master controller 360*b* monitors the AC bus 550 to determine when the voltage of the AC bus 550 decreases below the reference voltage for a period of time and is not increased back to the reference voltage At that point, the master controller 360*a* may recognize that the slave DC to AC converter 370*b* is no longer generating slave current 580*b* at the level sufficient to maintain the voltage of the AC bus 550 at the reference voltage. The master controller 360*a* may then instruct the master DC to AC converter 370*a* with the master power conversion signal 365*a* to increase the master current 580*a* to a level sufficient to increase the voltage of the AC bus 550 back to the reference voltage so that the paralleled output AC power may be maintained at the specified level. As a result, a delay in the powering of the external electronic device may be minimized despite the draining of the DC source of the slave power converter 530*b*.

Figure 5:
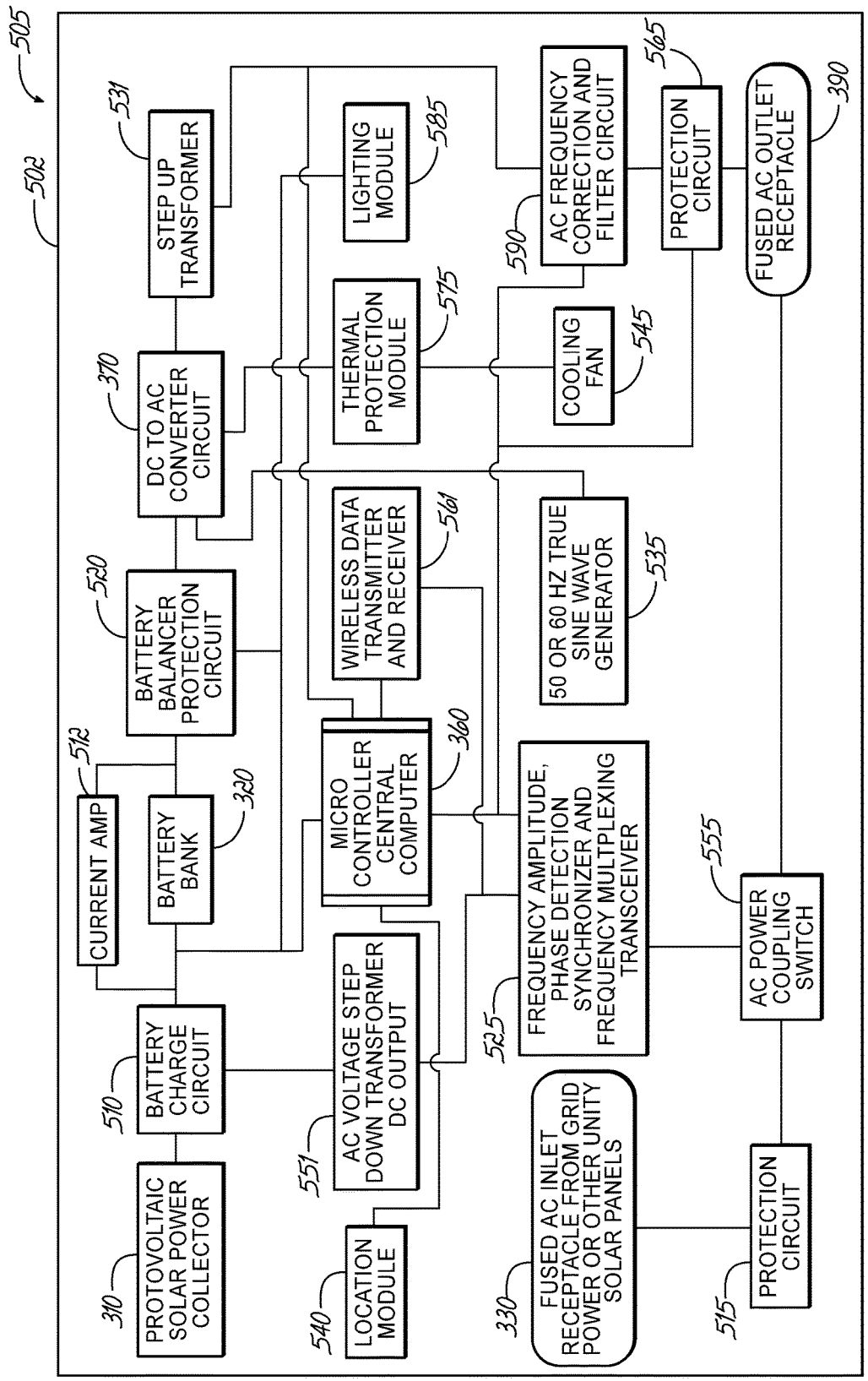
FIG. 5 is a block diagram of an exemplary solar panel that may be used in the solar panel configuration according to an exemplary embodiment of the present disclosure.

FIG. 5 is a block diagram of another exemplary solar panel 505 that may be used in the solar panel configuration 200 according to an exemplary embodiment of the present disclosure. Although, FIG. 5 depicts a block diagram of the solar panel 505, one of ordinary skill in the art will recognize that FIG. 5 may also depict a block diagram of one of the plurality of panels 100*a* through 100*n* used in the solar panel configuration 200 depicted in FIG. 2 as well as the solar panel 100 depicted in FIG. I. The features depicted in the block diagram of the solar panel 300 and 400 may also be included in the solar panel 505 but have been omitted for simplicity.

The solar panel 505 may be implemented using the solar power collector 310, a battery charge circuit 510, a current amplifier 512, the battery bank 320, a battery balancer protection circuit 520, a step up transformer 531, a location module 540, an AC voltage step down transformer DC output 551, a wireless data transmitter and receiver 561, a thermal protection module 575, an integrated light source module 585, an AC frequency correction and filter circuit 590, a protection circuit 515, a fused AC inlet receptacle from grid power or other unity solar panels 330, a micro controller central computer 360, the DC to AC converter circuit 370, a frequency, amplitude, phase detection synchronizer and frequency multiplexing transceiver 525, a 50 or 60 Hertz ("Hz") true sine wave generator 535, a cooling fan 545, a protection circuit 565, an AC power coupling switch 555, and a fused AC outlet receptacle 390, each of which is enclosed within a housing for the solar panel 505.

The battery charge circuit 510 may include passive and/or active circuitry as well as integrated circuits to control and/or regulate the charging of the battery bank 320 included within the solar panel 505. The battery charge circuit 510 may have bidirectional communication with a computing device, such as controller 360. The controller 360 may also control the battery charge circuit 510. The current amplifier 512 may increase the output current of the solar panel and assist in charging the battery bank 320.

The battery balancer protection circuit 520 is disposed within the housing 502 of the solar panel 505. The battery balancer protection circuit 520 may include passive and/or active circuitry as well as integrated circuits that may be controlled by the controller 360. The battery balancer protection circuit 520 may be used to ensure safe discharge and recharge of the individual cells within the battery bank 320.

The solar panel 505 may further include a location module 540. The location module 540 may include one or several location sensors such as but not limited to a global positioning system ("GPS"), a compass, a gyroscope, an altitude, and/or any other location sensor digital media file that will be apparent to those skilled in the relevant art(s) without departing from the spirit and scope of the disclosure. The location module 540 may be used to send data to the controller 360 through the wireless data transmitter and receiver 561 to an external personal computing device.

The AC voltage step down transformer 551 is included in the solar panel 505. The step down transformer 551 may be used to charge the battery bank 320 from the AC inlet receptacle 330 through the battery charge circuit 510. The step down transformer 551 may include iron, steel, ferrite, or any other materials and fashioned specifically to satisfy power requirements for charging the battery bank 320. The step down transformer 551 may also have a filtered DC output.

As discussed above, the solar panel 505 includes a computing device such as the controller 360. The controller 360 may be used to control and/or monitor the solar panel 505. The controller 360 may be a single or multiple processor based and may be able to receive software and/or firmware updates wirelessly through the associated wireless data transmitter and receiver 561 or through a hardware connection such as the frequency multiplexing transceiver 525. The controller 360 may be connected to any part of the solar panel 505 for central control, remote control, general monitoring, and/or data collection purposes. The wireless data transmitter and receiver 561 may use Bluetooth, Wi-Fi, cellular, and/or any other acceptable radio frequency data transmissions and reception techniques that will be apparent to those skilled in the relevant art(s) without departing from the spirit and scope of the disclosure. The transmitter and receiver 561 may be used to transmit data from the solar panel 505 to one or more external personal computing devices.

The solar panel 505 includes a thermal protection module 575. The thermal protection module 575 includes one or more sensors positioned in one or more locations throughout any part of the solar panel 505 for the purpose of temperature monitoring. The thermal protection module 575 is connected to the controller 360 and may be used to transmit data from the solar panel 505 to external personal computing devices.

As shown, the solar panel 505 may include the integrated light source 585. The integrated light source 585 may include one or more integrated lights inside or disposed on an exterior surface of the housing 502 of the solar panel 505 and may be used as a light source. The integrated lights may vary in color, intensity, temperature, size, frequency, and/or brightness. The integrated light source 585 may be coupled to the controller 360. The integrated light source 585 may be used to transmit data from the solar panel 505 to external personal computing devices.

The solar panel 505 further includes a grid frequency, amplitude, power phase detection synchronizer and frequency multiplexing transceiver 525, which may synchronize multiple AC power sources and transmit data between one or more solar panels 505 via a standard AC power line.

The solar panel 505 further includes a frequency generator, such as a 50 Hz or 60 Hz true sine wave generator 535. The frequency generator may also be other types of generators configured to output a signal at a particular reference frequency. The sine wave generator 535 may provide a sine wave reference to the DC to AC converter 370. The sine wave generator 535 may be coupled to the controller 360 as well as the grid frequency, amplitude, power phase detection synchronizer and frequency multiplexing transceiver 525. Moreover, the sine wave generator 535 may include analog and/or digital circuitry.

The solar panel 505 may further include a cooling fan 545 disposed within the housing 502 of the solar panel 505. The cooling fan 545 may include one or more cooling fans arranged in a way that best ventilates an interior at least partially formed by the housing 502 of the solar panel 505 in which one or more components are disposed. The cooling fan 545 may be coupled to the thermal protection module 575 and/or the controller 360.

Furthermore, the solar panel 505 includes an AC frequency correction and filter circuit 590. The frequency correction and filter circuit 590 may be controlled by the controller 360 through the 50 Hz or 60 Hz true sine wave generator 535. In addition, the frequency correction and filter circuit 590 may receive AC power from the step up transformer 531 and may output corrected and filtered AC power to a protection circuit 515 of the solar panel 505. The protection circuit 515 provides surge and fuse protection and may be controlled and monitored by the controller 360.

Moreover, the solar panel 505 has an AC coupling switch 555 that is configured to couple the AC power from the AC inlet receptacle 330 with AC grid equivalent power generated by the solar panel 505 such that synchronized AC power from the AC inlet receptacle 330 and the solar panel 505 are coupled together for output from the AC outlet receptacle 390. The AC coupling switch 555 may be controlled by the controller 360 in conjunction with the grid frequency, amplitude, power phase detection synchronizer and frequency multiplexing transceiver 525.

Figure 6:
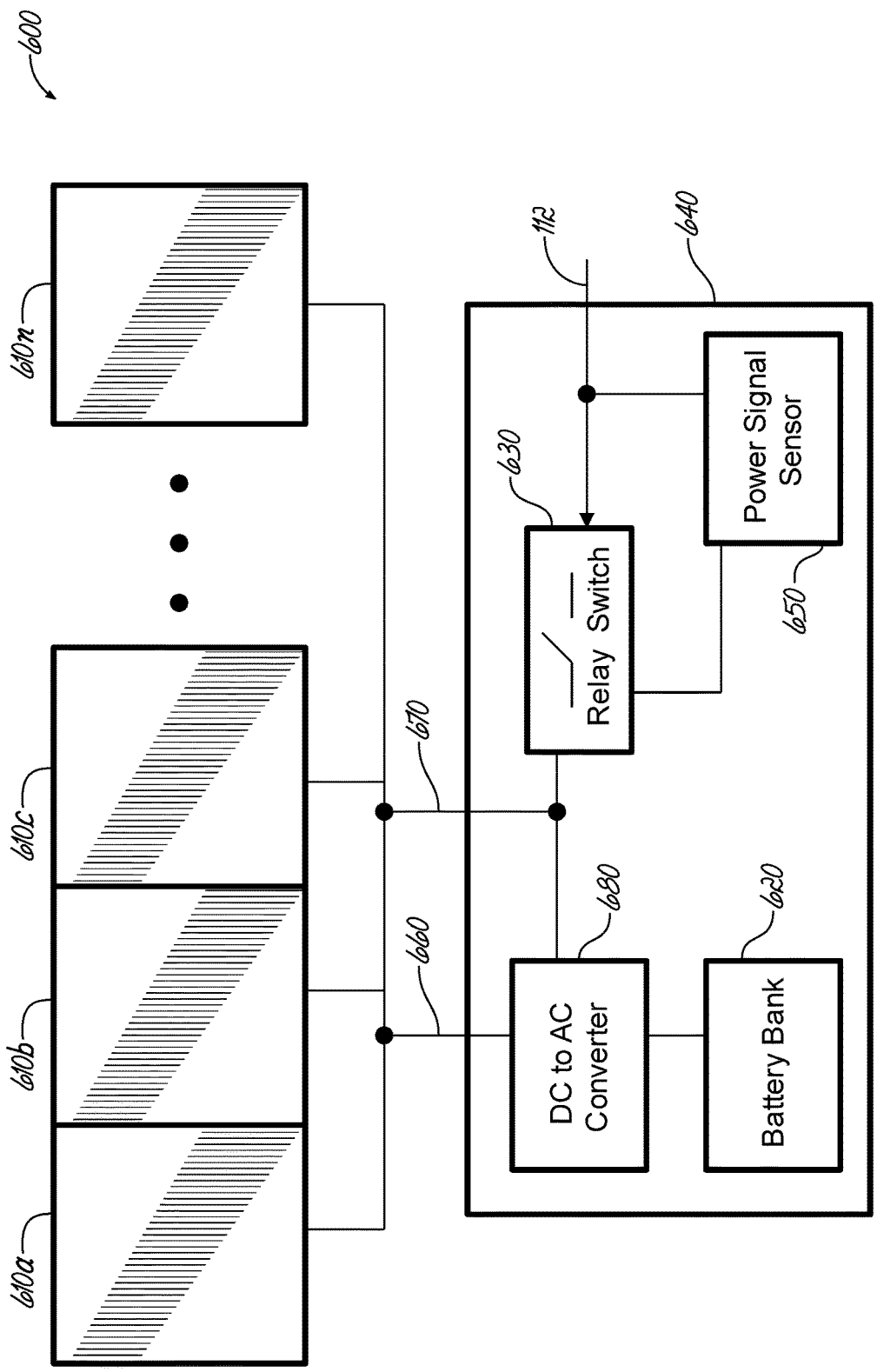
FIG. 6 is a block diagram of an exemplary solar panel configuration according to an exemplary embodiment of the present disclosure.

FIG. 6 illustrates a block diagram of another exemplary solar panel configuration according to an exemplary embodiment of the present disclosure. The solar panel configuration 600 includes a plurality of solar panels 610*a* through 610*n* that may be daisy chained together and coupled to a grid-tie system 640 to form the solar panel configuration 600, where n is an integer greater than or equal to one. The grid-tie system 640 monitors the input AC power 112 that is generated by the grid to determine whether the power grid remains stable to generate the input AC power 112. The grid-tie system 640 instructs the battery bank 620 to provide converted AC power 660 to the plurality of solar panels 610*a* through 610*n* when the grid tie system 640 determines that the power grid has failed. Thus, the grid-tie system 640 provides back up power to the plurality of solar panels 610*a* through 610*n* when the grid fails.

The grid-tie system 640 includes the battery bank 620, a relay switch 630, a DC to AC converter 680, and a power signal sensor 650. The solar panel configuration 600 shares many similar features with the solar panel 100, the plurality of solar panels 100*a* through 100*n*, the solar panel 300, the solar panel 400, the solar panel 500, and the solar panel configuration 200, and as such, only the differences between the solar panel configuration 600 and the solar panel 100, the plurality of solar panels 100*a* through 100*n*, the solar panel 300, the solar panel 400, the solar panel 500, and the solar panel configuration 200 are to be discussed in further detail.

The plurality of solar panels 610*a* through 610*n* may include larger solar panels with larger capacities to capture solar energy and convert the captured solar energy into DC power that may be stored in the battery bank 620. The grid-tie system 640 may automatically link the plurality of solar panels 610*a* through 610*n* to the input AC power 112 when the grid-tie system 640 is grid tied. The grid-tie system 640 may also automatically provide the converted AC power 660 to the plurality of solar panels 610a through 610n when the grid-tie system 640 is no longer grid tied such that the input AC power 112 is no longer available to the plurality of solar panels 610a through 610n.

Each of the plurality of solar panels 610a through 610n may be updated as to the status of the grid. For example, the plurality of solar panels 610a through 610n may be updated when the grid fails via a signal that is transmitted through the AC power line of the grid.

In another embodiment, the grid-tie system 640 may control the converted AC power 660 so that the DC power stored in the battery bank 620 is not depleted from the use of the converted AC power 660. For example, the grid-tie system 640 may dial back the use of the converted AC power 660 from maximum capacity to conserve the DC power stored in the battery bank 620.

The grid-tie system 640 includes a relay switch 630. The relay switch 630 transitions into an open state (logic 0) when the grid fails and is no longer providing the input AC power 112 to the grid-tie system 640 so that the grid-tie system 640 may be substantially disconnected from the grid. The grid-tie system 640 immediately instructs the DC to AC converter 680 to convert the DC power stored in the battery bank 620 to begin providing the converted AC power 660 to the plurality of solar panels 610a through 610n to replace the input AC power 112 no longer supplied to the grid-tie system 640. The converted AC power 660 may include power signal characteristics that have already been synchronized with the power signal characteristics included in the input AC power 112 before the grid went down. For example, the converted AC power 660 may include a frequency, phase, amplitude, voltage and/or current that is substantially similar to the frequency, phase, amplitude, voltage and/or current of the input AC power 112. As a result, the plurality of solar panels 610a through 610n fail to recognize that the grid has failed and is no longer providing the input AC power 112 to the grid tie system 640.

After the grid fails, the power signal sensor 650 continues to sense the power signal characteristics on the failed side of the relay switch 630. For example, the power signal sensor 650 continues to sense the voltage, current, frequency, and/or phase on the failed side of the relay switch 630. As the grid begins to come back up, the power signal sensor 650 recognizes that the power signal characteristics on the failed side of the relay switch 630 are beginning to show that the grid is coming back up. As the grid stabilizes, the grid tie system 640 begins to adjust the power signal characteristics of the converted AC power 660 to become substantially equivalent to the power signal characteristics of the input AC power 112 being sensed by the power signal sensor 650. For example, the grid tie system 640 synchronizes the converted AC power 660 so that the frequency, phase, amplitude, voltage, and current of the converted AC power 660 become substantially equivalent to the frequency, phase, amplitude, voltage, and current of the of the input AC power 112 being sensed by the power signal sensor 650.

After the power signal characteristics of the converted AC power 660 are substantially equivalent to the power signal characteristics of the input AC power 112, the grid tie system 640 transitions the relay switch 630 into a closed position (logic 1). The plurality of solar panels 610a through 610n are then no longer running off of the converted AC power 660 but are rather running off of the input AC power 112 provided by the grid.

Figure 7:
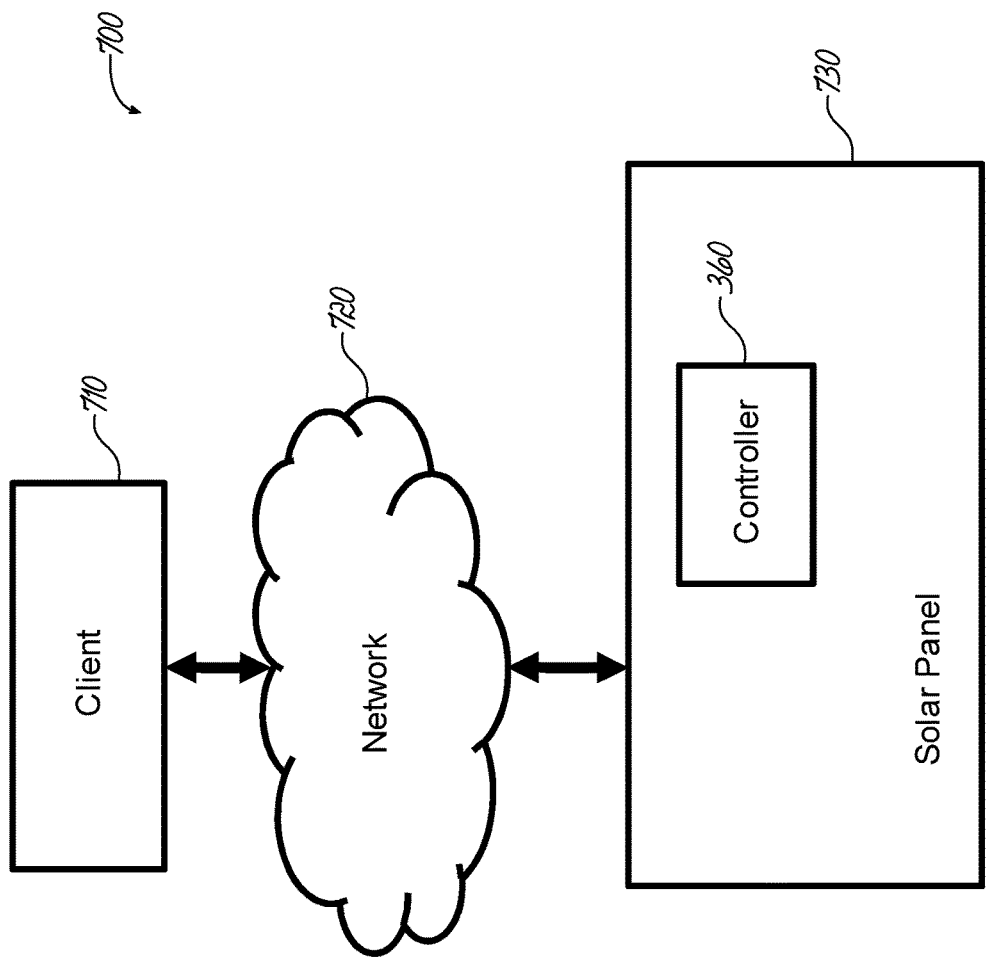
FIG. 7 illustrates a wireless solar panel configuration.

FIG. 7 shows an illustration of a wireless solar panel configuration 700. The wireless solar panel configuration 700 includes a client 710, a network 720, and a solar panel 730.

One or more clients 710 may connect to one or more solar panels 730 via network 720. The client 710 may be a device that includes at least one processor, at least one memory, and at least one network interface. For example, the client may be implemented on a personal computer, a hand held computer, a personal digital assistant ("PDA"), a smart phone, a mobile telephone, a game console, a set-top box, and the like.

The client 710 may communicate with the solar panel 730 via network 720. Network 720 includes one or more networks, such as the Internet. In some embodiments of the present invention, network 720 may include one or more wide area networks ("WAN") or local area networks ("LAN"). Network 720 may utilize one or more network technologies such as Ethernet, Fast Ethernet, Gigabit Ethernet, virtual private network ("VPN"), remote VPN access, a variant of IEEE 802.11 standard such as Wi-Fi, and the like. Communication over network 720 takes place using one or more network communication protocols including reliable streaming protocols such as transmission control protocol ("TCP"). These examples are illustrative and not intended to limit the present invention.

The solar panel 730 includes the controller 360. The controller 360 may be any type of processing (or computing) device as described above. For example, the controller 360 may be a workstation, mobile device, computer, and cluster of computers, set-top box, or other computing device. The multiple modules may also be implemented on the same computing device, which may include software, firmware, hardware, or a combination thereof. Software may include one or more application on an operating system. Hardware can include, but is not limited to, a processor, memory, and a graphical user interface ("GUI") display.

The client 710 may communicate with the solar panel 730 via network 720 to instruct the solar panel 730 as to the appropriate actions to take based on the time of the day, weather conditions, travel arrangements, energy prices, etc. For example, the client 710 may communicate with the solar panel 730 to instruct solar panel 730 to charge its batteries via the input AC power provided by the grid during times of the day in when the sunlight is not acceptable. In another example, the client 710 may communicate with the solar panel 730 via network 720 to instruct the solar panel 730 to operate off of the DC power provided by the internal batteries included in the solar panel 730 during peak utility hours. In such an example, the client 710 may communicate with the solar panel 730 to charge its internal batteries from the solar energy captured by the solar panel 730 during off peak hours while the solar panel 730 relies on the input AC power provided by the grid. The client 710 may then communicate with the solar panel 730 to run off of its charged internal batteries during peak hours when the grid is stressed. In another embodiment, the client 710 may communicate with the solar panel 730 via network 720 to receive status updates of the solar panel 730.

The solar panel 730 may also include a GPS. The client 710 may communicate with the solar panel 730 via network 720 to analyze the GPS coordinates of the solar panel 730 and adjust the solar panel 730 so that the solar panel 730 may face the sun at an angle that maximizes the solar energy captured.

The solar panel 730 may also include a tilt mechanism that is built into its back that has a stepper motor that adjusts the angle of solar panel 730 to maximize its exposure to solar energy.

The client 710 may also remotely control the output AC power of the solar panel 730 via the network 720. Hence, the client 710 may dial back the output AC power of the solar panel 730 so that the DC power stored in the battery bank of the solar panel 730 is not depleted.

In one embodiment, the client 710 may obtain information regarding the solar panel 730 via the network 720 that may include but is not limited to energy produced by the solar panel 730, energy consumed by the solar panel 730, the tilt of the solar panel 730, the angle of the solar panel 730, the GPS coordinates of the solar panel 730, and any other information regarding the solar panel 730 that may be communicated to the client 710 via the network 720 that will be apparent to those skilled in the relevant art(s) without departing from the spirit and scope of the disclosure.

Figure 8:
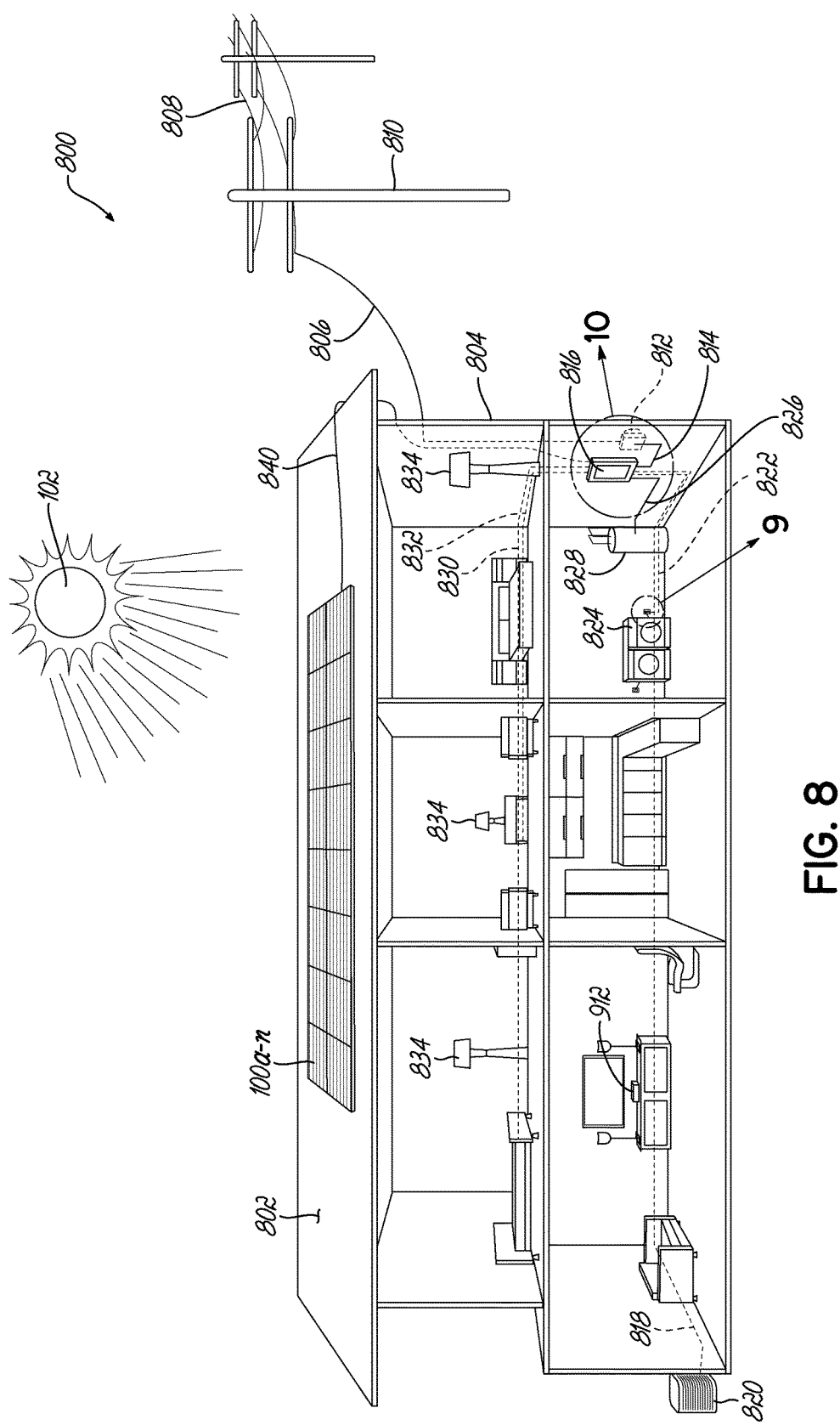
FIG. 8 is a schematic diagram of the solar panels incorporated into a domestic configuration according to an exemplary embodiment of the present disclosure.

FIG. 8 illustrates a schematic view of the solar panels 100(a-n) incorporated into a domestic configuration 800 according to an exemplary embodiment of the present disclosure. The domestic configuration 800 may include a configuration in which the solar panels 100(a-n) are incorporated to provide output AC power 195n that is in parallel with output AC power 195a and 195b such that the output AC power 195n provides sufficient power for the domestic configuration 800. For example, the solar panels 100(a-n) may provide output AC power 195n that is sufficient to satisfy the power needs of a residential home. The solar panels 100(a-n) may be incorporated into any type of domestic configuration 800 that requires output AC power to satisfy its power needs that will be apparent to those skilled in the relevant art(s) without departing from the spirit and scope of the disclosure.

The solar panels 100(a-n) may be positioned on a rooftop 802 of a dwelling 804 in such a way as to receive solar energy 102 from the sun and/or other solar light sources. The solar panels 100(a-n) may also be positioned on other parts of the structure 804 such as the sides of the structure and may even be detached from the structure 804. The solar panels 100(a-n) may be positioned in any type of manner relative to the dwelling 804 such that the solar panels 100(a-n) adequately capture the solar energy 102 from the sun and adequately provides the output AC power 195n to the dwelling 804 to adequately satisfy the power needs of the dwelling 804 that will be apparent to those skilled in the relevant art(s) without departing from the spirit and scope of the disclosure.

As noted above, the dwelling 804 may also be connected via a standard power line 806 to a commercial electric utility grid 808 via distribution and/or sub-distribution to power lines as well as connected to the solar panels 100(a-n). In doing so, the dwelling 804 may receive AC power from the electric utility grid 808 when the solar panels 100(a-n) may no longer provide output AC power 195n that is sufficient to satisfy the power needs of the dwelling 804. The power line 806 may include above ground distribution lines, underground power lines either from the dwelling 804 to the pole 810, the dwelling 804 to an underground distribution system, a combination of overhead and underground power cables, and/or any other type of power distribution configuration in which the dwelling 804 is adequately connected to the commercial electric utility grid 808 that will be apparent to those skilled in the relevant art(s) without departing from the spirit and scope of the disclosure.

The power line 806 may be connected to the dwelling 804 at the electrical utility meter 812. The utility meter 812 may then be connected via a wire 814 to the electrical panel 816, which may be located inside or outside of the dwelling 804. The electric meter 812 may track the amount of power that is being drawn from the electric utility grid 808 into and used within the dwelling 804. The solar panels 100(a-n) may be connected to the breaker box 816 via a single wire or cable 840. The cable 840 from the solar panels 100(a-n) may also directly feed a single device such as a clothes dryer.

The electric panel 816 may have a number of circuits that power various aspects of the dwelling 804. For example, the electric panel 816 may have a first line circuit 818 that may power a first appliance such as an outside air conditioner unit 820, a second line circuit 822 that may power a second appliance such as washing machine 824, and a third line circuit 826 that powers an electric hot water heater 828. A typical dwelling 804 may also have numerous circuits 830, 832 which may be used to power various rooms or sections of the dwelling 804 that will be apparent to those skilled in the relevant art(s) without departing from the spirit and scope of the disclosure.

Figure 9:
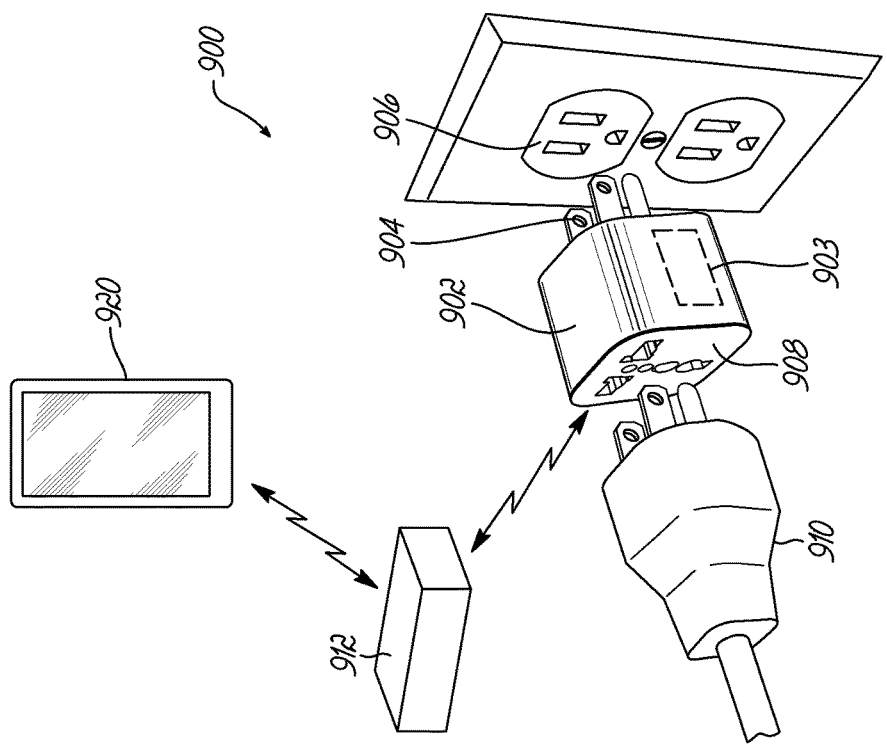
FIG. 9 illustrates an embodiment of a power controller of the present disclosure.

FIG. 9 illustrates an embodiment of a power controller configuration 900 of the present invention. More specifically, a plug or outlet power controller 902 consists of a standard three pronged male connection 904 at one end that is adapted to mate with a standard wall outlet 906. At the other end 908, the outlet controller 902 has a standard multi-pronged female receptacle, which is configured to receive a standard electrical appliance power cord 910 with a male two or three pronged plug assembly 910. One who is skilled in the art can appreciate that in various circumstances the orientation of the plugs and prongs could be reversed without detracting from the present invention.

The power outlet controller 902 is further configured with a wireless communication circuitry 903 to enable it to connect and communicate wirelessly with the solar panel 100 as well as the user's cell phone 920. The power outlet controller 902 may communicate with the solar panel 100 as well as the user's cell phone 920 via an Internet connection incorporated through the cloud or similar wireless communication infrastructures that will be apparent to those skilled in the relevant art(s) without departing from the spirit and scope of the disclosure. As will be discussed in further detail below, the power outlet controller 902 may communicate power data associated with the devices that are coupled to the power outlet controller 902 to the solar panel 100 as well as the user's cell phone 920 via the Internet connection as well as enable the user to remotely operate the devices coupled to the power outlet controller 902 via the user's cell phone 920.

In addition to the wireless communication via an Internet connection incorporated through the cloud, the power outlet controller 902 may also have the capability to have a direct wireless connection with the solar panel 100 as well as the user's cell phone 920 when the an Internet connection is unavailable. For example, the power outlet controller 902 may have the capability to have a direct wireless connection with the solar panel 100 as well as the user's cell phone 920 via low-power wireless communication protocols such as Wi-Fi, Bluetooth, and/or other low-power wireless communication protocols that will be apparent to those skilled in the relevant art(s) without departing from the spirit and scope of the disclosure.

The wireless communication capability between the power outlet controller 902 and the solar panel 100 as well as the user's cell phone 920 via the Internet connection through the cloud as well as a direct connection via a low-power wireless communication protocol provides redundancy to ensure that the wireless communication between the power outlet controller 902, the solar panel 100, and the user's cell phone 920 is maintained. The redundancy with the direct connection via the low-power wireless communication protocols in addition to the Internet connection through the cloud ensures that wireless communication is maintained between the power outlet controller 902, the solar panel 100, and the user's cell phone 920 when a satisfactory signal to connect to the Internet via the cloud between the power outlet controller 902, the solar panel 100, and the user's cell phone 920 is unavailable.

In doing so, the power data generated by the devices coupled to the power outlet controller 902 may be continuously provided to the solar panel 100 and the user's cell phone 920 allowing the devices to be intelligently operated based on the power consumption of the devices to ensure that the devices may be solely powered by the solar panel 100 and not require power from the electric utility grid 808. Further, the redundancy in communication ensures that the user may continue to remotely operate the devices coupled to the power outlet controller 902 so that the devices may be powered down to prevent unnecessary power consumption. In other embodiments, the outlet power controller 902 may also wirelessly communicate with a central communication and control center or hub 912, which in turn may communicate wirelessly with the solar panels 100($a$-$n$).

As noted above, the communication circuitry enables the power controller 902 to wirelessly communicate with the solar panel 100 as well as the user's cell phone 920. In doing so, the power controller 902 may provide power data that is associated with each of the devices that is coupled to the power controller 902 to the solar panel 100 and the user's cell phone 920. Power data may be data that is generated as each of the devices coupled to the power controller 902 consumes power.

For example, power may include data that provides the amount of wattage consumed by each of the devices coupled to the power controller 902 as each of the devices operate. The power data may provide the amount of power consumed by each of the devices over time as the device operates as well as the amount of power that is consumed by each of the devices at each moment as the device operates. For example, the power data generated by a dishwasher may provide the amount of power consumed by the dishwasher as the dishwasher operates as well as the amount of power that the dishwasher consumes during each cycle. The power data may include any type of data associated with the power consumption of the devices coupled to the power controller 902 that will be apparent to those skilled in the relevant art(s) without departing from the spirit and scope of the disclosure.

The user and/or solar panel 100 may then monitor the power data as provided via wireless communication by the power controller 902 to control each of the devices coupled to the power controller 902. For example, the user may monitor the power data generated by a lamp that is coupled to the power controller 902 as displayed to the user via the user's cell phone 920. As the amount of output AC power 195$n$ generated by the solar panel 100 that is available to the lamp decreases such that any further power consumption by the lamp may require AC power generated by the electric utility grid 808, the user may determine that deactivating the lamp is an appropriate action to ensure that power is not consumed from the electric utility grid 808.

The user may also remotely control the each of the devices coupled to the power controller 902 via the wireless communication between the power controller 902 and the user's cell phone 920. For example, several different devices such as a lamp and a television may be coupled to the power controller 902. Based on the power data associated with the lamp and the television provided by the power controller 902, the user may remotely deactivate the television while leaving the lamp activated to prevent power from being consumed by the electric utility grid 808 to power both the lamp and the television.

The power controller 902 may also control the amount of power that is provided to the device coupled to the power controller 902 via the electric cord 910. As noted above, the device that is coupled to the power controller 902 may receive output AC power as provided by the solar panels 100($a$-$n$). The amount of output AC power provided by the solar panels 100($a$-$n$) via the power controller 902 may be at a sufficient level such that the device has an adequate amount of output AC power for the device to operate and execute all of the features associated with the device to satisfy the needs of the operator.

Conventionally, the amount of output AC power provided by the electric utility grid to the typical dwelling 804 is at a level that is sufficient to provide adequate output AC power to any device that the user operates within the typical dwelling 804. For example, the standard wall outlet 906 may provide output AC power at a constant level of 500 W to satisfy the power requirements of any type of device that is coupled to the standard wall outlet 906. In such an example, the user may couple a hair dryer that requires 250 W to the standard wall outlet 906 and then couple an electric razor that requires 50 W. The amount of AC power required by the electric razor is sufficiently less than the amount of AC power required by the hair dryer. However, the electric utility grid constantly provides 500 W to ensure there is sufficient output AC power for any device that the user couples to the standard wall outlet 906 whether the user couples the 250 W hairdryer or the 50 W razor. Conventionally, there is a failure to vary the amount of output AC power that is provided via the standard AC power outlet 906 based on the power requirements of the device coupled to the standard wall outlet 906.

The power controller 902 may vary the amount of output AC power that is provided to the device that is coupled to the power controller 902 such that the output AC power provided to the device is substantially similar to power requirements of the device to adequately operate. As noted above, the solar panels 100($a$-$n$) provide output AC power that may be provided to the standard wall outlet 906 such that any device that is coupled to the power controller 902 that is in turn coupled to the standard wall outlet 906 may operate via the output AC power generated by the solar panels 100($a$-$n$). Depending on the amount of solar panels 100($a$-$n$) that are daisy chained together, the amount of available output AC power may be significant and capable of satisfying the power requirements of any device that the user requests to power via the standard wall outlet 906. For example, three solar panels 100($a$-$c$) each capable of providing 500 W each may be daisy chained together to provide a total of 1500 W of output AC power.

Rather than providing the maximum amount of available output AC power generated by the solar panels 100($a$-$n$), the power controller 902 may vary the amount of output AC power that is provided to the device such that the amount of output AC power is substantially similar to the power requirements of the device. For example, the user couples the 50 W electric razor to the power controller 902 which is in turn coupled to the standard wall outlet 906. Rather than providing the maximum amount of 1500 W generated by the solar panels 100(*a-c*) to the 50 W electric razor, the power controller 902 controls the amount of output AC power that is provided to the 50 W electric razor to be 50 W. As a result, sufficient output AC power is provided to the 50 W electric razor so that the user may operate the electric razor in a satisfactory manner while preventing a significant amount of unnecessary output AC power from being provided to the 50 W electric razor.

The power controller 902 may also control the amount of output AC power generated by the solar panels 100(*a-n*) that is provided to the device to be a sufficient amount such that when the device is coupled to the power controller 902 is activated, no output AC power generated by the electric utility grid is required to power the device. Often times particularly when a device with significant power requirements is activated, a significant spike in output AC power that is to be provided by the standard wall outlet 906 occurs.

Often times, the amount of AC power currently provided to the standard wall outlet 906 by the electric utility grid may momentarily be insufficient to adequately satisfy the power requirements of the newly activated device as well as the other devices consuming power in the typical dwelling 804. In those instances, the lights and other devices consuming power in the typical dwelling 804 may temporally deactivate as the electric utility grid provides sufficient output AC power to the typical dwelling 804 and then reactivate all of the devices that the user is operating.

With regard to the output AC power provided by the solar panels 100(*a-n*), the power controller 902 may ensure a sufficient amount of output AC power as generated by the solar panels 100(*a-n*) is provided to the device coupled to the power controller 902. The power controller 902 may ensure that the device operates completely from output AC power generated by the solar panels 100(*a-n*) so substantially no output AC power as generated by the electric utility grid is required to power the device.

The power controller 902 may ensure that the device operates completely from output AC power generated by the solar panels 100(*a-n*) even during an instance when the device has significantly high power requirements and is first activated as long as the available output AC power generated by the solar panels 100(*a-n*) is sufficient to power the device. Thus, the electric utility meter associated with the typical dwelling 804 may fail to detect any activity associated with the activation of the device that is coupled to the power controller 902 due to the power controller 902 ensuring that no power as generated by the electric utility grid is provided to the device. From the perspective of the electric utility meter, no such device was even activated due to the lack of power generated by the electric utility grid that the device failed to consume.

For example, the user couples a 500 W portable heater to the power controller 902. The power controller 902 then determines the power requirements of portable heater and understands that when the user activates the 500 W portable heater, not only is the portable heater going to require 500 W but instantly introducing 500 W may trigger a spike in output AC power that is provided to the typical dwelling 804. As the user activates the 500 W portable heater, the power controller 902 ensures that of the 1500 W generated by the solar panels 100(*a-c*) that 500 W of the 1500 W is available for the 500 W portable heater to consume such that no output AC power from the electric utility grid is required to power the 500 W portable heater even when the 500 W portable heater is first activated.

The power controller 902 may also provide unused output AC power that is generated by the solar panels 100(*a-n*) to the electric utility grid. There may be instances when the solar panels 100(*a-n*) have stored a significant amount of output AC power that exceeds the power needs of the user and/or the typical dwelling. In such instances, the user and/or typical dwelling may have no need for the additional amount of AC power stored by the solar panels 100(*a-n*) that exceeds the power needs of the user and/or typical dwelling. Thus, the power controller 902 may provide the unused output AC power as generated by the solar panels 100(*a-n*) to the electric utility grid via the standard wall outlet 906. The power controller 902 may then track the amount of unused output AC power that is provided to the electric utility grid such that the user and/or owner of the typical dwelling 804 may be appropriately compensated by the electric utility company for the output AC power provided to the electric utility grid.

Additionally, the central communication hub 912 may contain motion sensing and/or audio sensing circuitry to allow it to determine automatically when a user may or may not be present in the home. In other words, in one embodiment, if the central communication and control center 912 senses that there has been no motion in the room where it is located for a particular time, it may automatically power down any electronic devices, for example, lights, TV, audio equipment, and the like in that room. Similarly, it may also power down other aspects of the home by virtue of not hearing any activity in the home through its audio detection circuitry. Conversely, upon sensing, whether via audio indication, or motion indication, that there is activity again within the house or soon to be within the house, for example, sensing a garage door opening, a doorbell ringing, or any other like motion and/or audio inputs, it may power up certain aspects of the home. For example, it may turn on lights in a particular section of the home from which it senses an audio input. A doorbell ringing or a knock on the door may trigger the illumination of that room or other rooms within the home. Obviously this has additional ramifications in addition to power management, such as safety and security of the home and deterrence of burglaries and the like.

Figure 10:
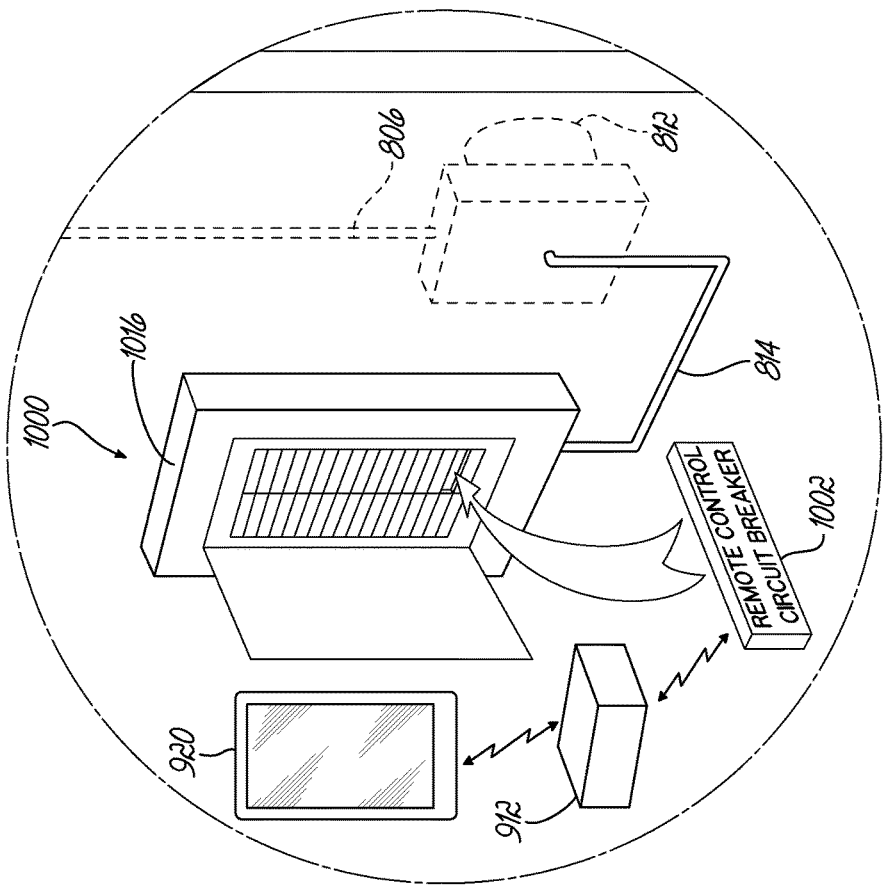
FIG. 10 illustrates another embodiment of a power controller of the present disclosure.

FIG. 10 illustrates another embodiment of a power controller configuration 1000 of the present invention. In this embodiment, the breaker box 1016 has a remote control circuit breaker 1002 which is in operable wireless communication with solar panel 100 by means of Wi-Fi, Bluetooth, or like communication protocols. The remote control circuit breaker 1002 will turn power on or off to a particular single device, or to multiple devices that are connected to that particular circuit. In other words, the remote control circuit breaker 1002 might control power to a single device such as a hot water heater 828 or it might control the lights 834 in one or more rooms such as illustrated by circuits 830, 832.

In an operation, the power controllers 902, 1002 sense when a particular electronic device such as a lamp 834 is turned on and is requiring power. It then wirelessly communicates with the solar panel 100*a*, typically via central communication hub 912. The solar panel 100*a* can then provide power to the home 804 in the amount required by the particular device, for example the lamp 834. A user can also wirelessly communicate with and control the power controllers, for example, via the central communication hub 912 from a smart phone 920.

Figure 11:
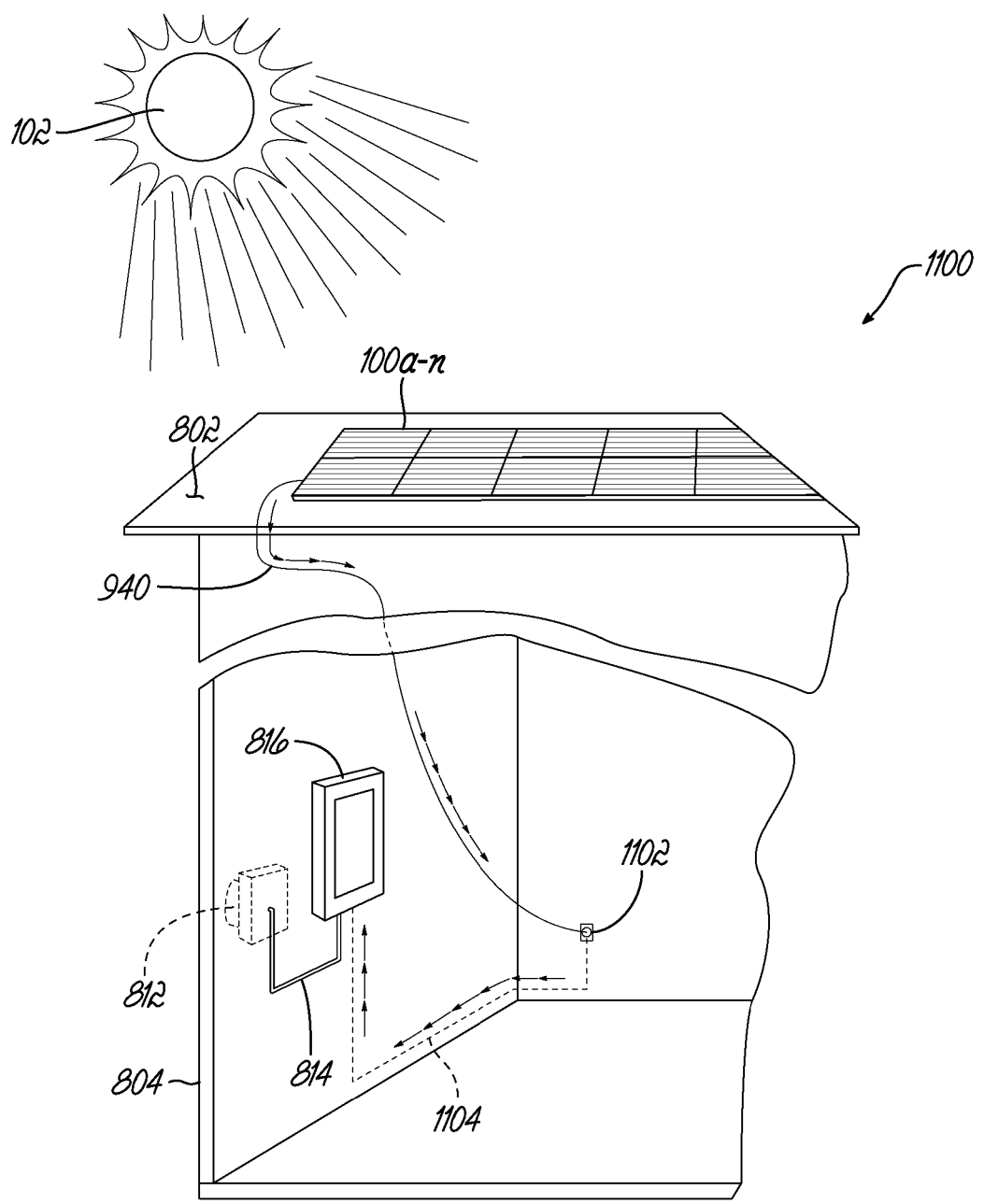
FIG. 11 illustrates an embodiment of a power adapter of the present disclosure.

FIG. 11 illustrates another embodiment of a solar panel configuration 1100 wherein the solar panels 100(a-n) directly supply power via a cable 840 to a power adapter 1102. The power adapter 1102 is typically designed for a high voltage appliance such as might be found in a residential clothes dryer operating at 240 volts. In this embodiment, the solar panels 100(a-n) supply the power needed directly to the power or outlet adapter 1102 without routing the power through the breaker box 816. Nevertheless, because the outlet that the power adapter 1102 is itself wired 1104 to the breaker box 816, power and communication may still be routed through that line 1104. It should also be noted that in various embodiments, some lines 940 from a particular solar panel or panels 100(a-n) may be connected directly to a power adapter 1102, while other lines from different solar panels 100(a-n) may run directly to the breaker box 816. In other words, one could have the configuration 1100 shown in FIG. 11 wherein the solar panels 100(a-n) directly power an outlet or in the configuration 800, as shown in FIG. 8 where the solar panels 100(a-n) directly power a breaker box, or a combination of these arrangements.

Figure 12:
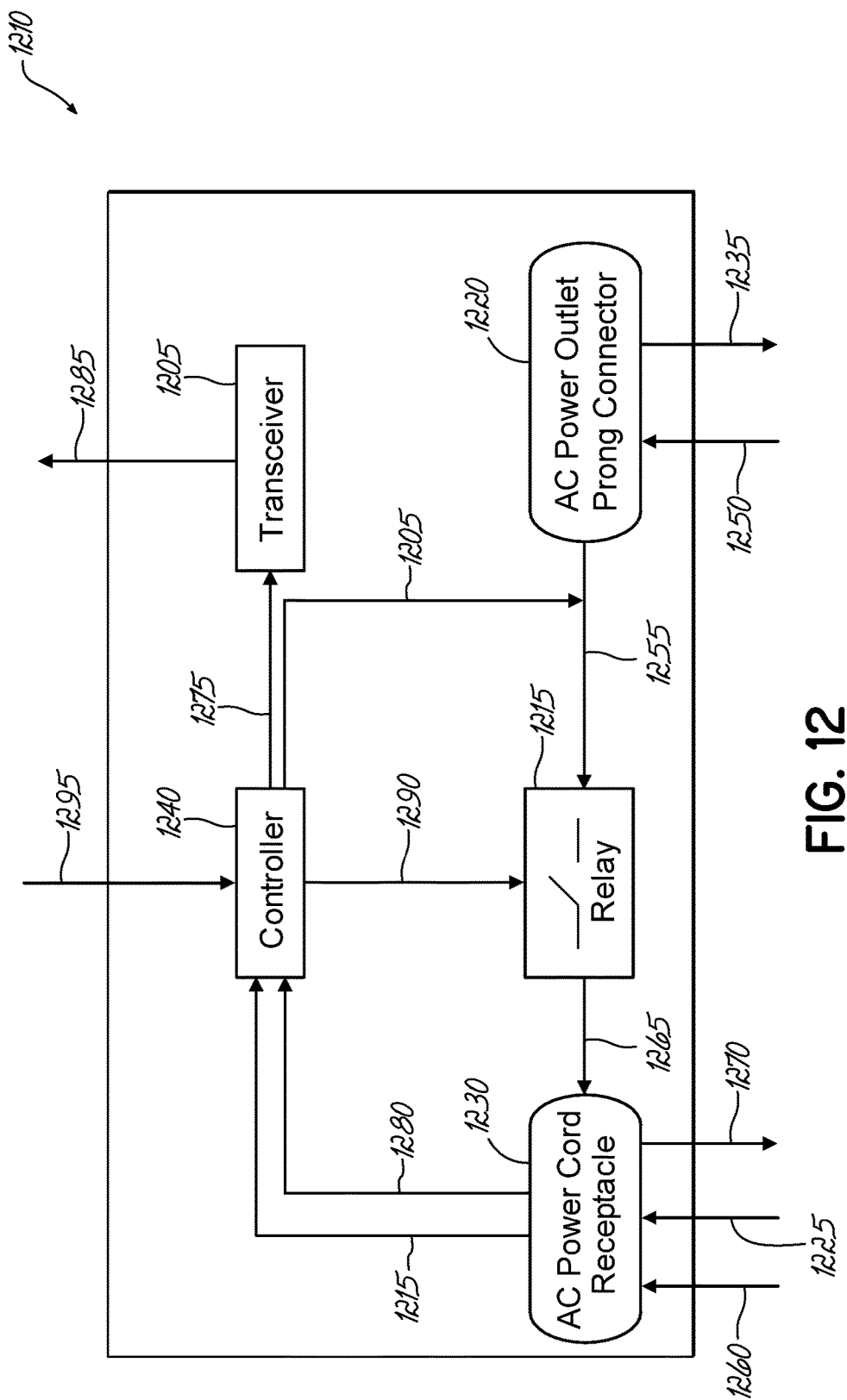
FIG. 12 illustrates a block diagram of an exemplary power controller that may be used as an interface to provide output AC power generated by the solar panel and transported via the standard wall outlet to power devices that are coupled to the power controller.

FIG. 12 is a block diagram of an exemplary power controller 1210 that may be used as an interface to provide output AC power 195n generated by the solar panel 100 and transported via the standard wall outlet 906 to power devices that are coupled to the power controller 1210 according to an exemplary embodiment of the present disclosure. Although, FIG. 12 depicts a block diagram of the power controller 1210, one of ordinary skill in the art will recognize that FIG. 12 may also depict a block diagram of the power adapter 1102 depicted in FIG. 11, the remote control circuit breaker 1002 depicted in FIG. 10, and the power controller 902 depicted in FIG. 9.

The power controller 1210 may enable the user to remotely control each of the devices coupled to the power controller 1210 via the user's smart phone 920 as well as provide power data that is generated by each of the devices coupled to the power controller 1210 as each of the devices consume power to the user's smart phone 920. The power controller 1210 shares many similar features with the power controller 902, the remote control circuit breaker 1002, and the power adapter 1102; therefore only the differences between the power controller 1210 and the power controller 902, the remote control circuit breaker 1002, and the power adapter 1102 are to be discussed in further detail.

As noted above, the user may remotely control each of the devices coupled to the power controller 1210 based on wireless communication established between the user's smart phone 920 and the power controller 1210. In doing so, the user may activate and/or deactivate each of the devices coupled to the power controller 1210 based on power data associated with each of the devices that is provided to the user's smart phone 920 by the power controller 1210. However, there may be instances where the user is located within the dwelling 804 that includes each of the devices that are coupled to the power controller 1210. In such a situation, the user is no longer remotely located from the devices but is rather positioned within the dwelling 804 and may manually activate and/or deactivate each of the devices without having to do so via the user's smart phone 920.

For example, the user may be located in the dwelling 804 in the evening after spending the majority of the day at work and has exhausted the battery power of user's smart phone 920 such that the user's smart phone 920 is incapable of wirelessly communicating with the power controller 1210 to enable the user to activate and/or deactivate the devices coupled to the power controller 1210. However, the user desires to active a lamp that is coupled to the power controller 1210 and positioned within the dwelling 804 with the user but cannot activate the lamp via the user's smart phone 920 due to the smart phone 920 being temporarily incapable of wirelessly communicating with the power controller 1210.

Rather than the user having to proceed without activating the lamp and/or manually unplug the lamp from the power controller 1210 and then manually plug the lamp directly into the standard wall outlet 906, the user may manually switch the lamp between the off-position to the on-position. Each time the user transitions the lamp from the off-position to the on-position, the user introduces a level of impedance into the power controller 1210 that is associated with the light bulb that is coupled to the lamp. Although the light bulb does not actually activate to introduce the full wattage that is associated with the light bulb when activated to the power controller 1210, a level of impedance that is associated with the light bulb in the deactivated state when the lamp is in the on-position still exists and is introduced to the power controller 1210.

As the user transitions the lamp from the off-position to the on-position, the power controller 1210 transitions from sensing an open circuit when the lamp is in the off-position to sensing the level of impedance associated with the light bulb in the deactivated state when the lamp is in the on-position. The power controller 1210 may then recognize that the user is attempting to activate the lamp based on the transition from the open circuit to the level of impedance associated with the light bulb in the deactivated state and may automatically activate the lamp such that the light bulb is in the activated state and emits light based on the wattage capabilities of the light bulb. In doing so, the user may activate the lamp without having to do so with the user's smart phone 920.

In an embodiment, each of the devices coupled to the power controller 1210 may be coupled via an AC power cord receptacle 1230 associated with each of the devices. For example, a television may be coupled to a first AC power cord receptacle 1230 and a lamp may be coupled to a second AC power cord receptacle. The device may couple to the power controller 1210 by plugging the AC power cord associated with the device into the AC power cord receptacle 1230.

After the device is coupled to the power controller 1210 via the AC power cord receptacle 1230, the device may provide an impedance signal 1260 to the AC power cord receptacle 1230. The impedance signal 1260 may provide data associated with the impedance that the device is introducing to the power controller 1210. For example, the impedance signal 1260 may represent an open circuit when the device is in the deactivated state. The impedance signal 1260 may then represent a high level of impedance when the device is in the activated state. The impedance signal may then represent an intermediate level of impedance when the user is transitioning the device from the off-position to the on-position and is thus introducing a level of impedance to the power controller 1210 but the device has yet to be activated and provided sufficient power to operate in the activated state and consume power that satisfies the wattage capabilities of the device.

For example, the power cord associated with the lamp is plugged into the AC power cord receptacle 1230. The lamp generates the impedance signal 1260 to the power controller 1210 that represents the open circuit when the lamp is in the deactivated state. The lamp then generates the impedance signal 1260 at a high level of impedance when the lamp is actually in the activated state and the light bulb is in the activated state and consuming power based on the wattage capabilities of the light bulb. The lamp then generates the impedance signal 1260 at an intermediate level of impedance when the user is transitioning the lamp from the off-position to the on-position. In doing so, a level of impedance associated with the light bulb is introduced to the power controller 1210 despite the light bulb not being in the activated state in which the light bulb is consuming power based on the wattage capabilities of the light bulb.

The AC power cord receptacle 1230 may provide an impedance level signal 1280 to the controller 1240. The impedance level signal 1280 may represent the amount of impedance that is being introduced to the power controller 1210 via the AC power cord receptacle 1230 by the device. For example, the impedance level signal 1280 may provide an impedance level that corresponds to an open circuit when the device is in the deactivated state, a high impedance level that corresponds to the device being in the activated state, and an intermediate impedance level when the user is attempting to transition the device from the off-position to the on-position but sufficient power is not yet provided to the device allowing the device to operate fully in the activated state and consume wattage.

The controller 1240 may monitor the impedance level signal 1280 to determine whether the user is attempting to transition the device from the deactivated state to the activated state. As noted above, the impedance level signal 1280 that represents an impedance level that is associated with an open circuit is generated when the device is in the deactivated state. The controller 1240 may monitor the impedance level signal 1280 to determine when the impedance level signal 1280 transitions from an impedance level associated with an open circuit to an impedance level that exceeds a threshold. The threshold is an impedance level that when exceeded provides a strong indicator that the user is attempting to activate the device.

For example, the threshold is an impedance level that is exceeded by the impedance level associated with the light bulb of the lamp as the user transitions the lamp from off-position to the on-position but before the light bulb is activated and is consuming the wattage at a level associated with the light bulb. The controller 1240 may also monitor the resistance, current, voltage, and/or any other characteristic that is generated by the device as the user transitions the device from the off-position to the on-position that may be monitored by the controller 1240 to determine that the user is attempting to activate the device that will be apparent to those skilled in the relevant art(s) without departing from the spirit and scope of the disclosure.

In an embodiment, the threshold may be customized based on the device that the controller 1240 is monitoring. For example, the threshold associated with a first device, such as a lamp, may differ from the threshold associated with a second device, such as a television. In such an example, the impedance that is introduced by the light bulb as the user transitions the lamp from the off-position to the on-position with the light bulb still being in the deactivated state may differ from the impedance introduced by the television as the user transitions the television from the off-position to the on-position while the television is still in the deactivated state.

The threshold of impedance that the controller 1240 is monitoring may be automatically adjusted based on the device that is generating the impedance. For example, the threshold may be automatically adjusted from an impedance level associated with the lamp to the impedance level associated with the television when the controller 1240 is monitoring the television. The threshold may also be manually adjusted based on the device that the controller 1240 is monitoring. Thus, the threshold that the controller 1240 monitors may be customized to the device such that the threshold is exceeded by the impedance introduced by the device as the user transitions the device from the off-position to the on-position but the device is still in the deactivated state and not consuming the wattage associated with the device.

The controller 1240 may then generate a relay signal 1290 that transitions the relay 1215 from an open state to a closed state when the impedance level signal 1280 provides an impedance level to the controller 1240 that exceeds the threshold. As noted above, the user may attempt to transition the device from the deactivated state to the activated state by transitioning the device from the off-position to the on-position. In doing so, the device despite still being in the deactivated state may generate an impedance signal 1260 that indicates a level of impedance that has been introduced to the power controller 1210 by the user transitioning the device from the off-position to the on-position despite the device not yet operating in the activated state. The controller 1240 may then determine that the impedance level signal 1280 exceeds the threshold in that the impedance level being introduced to the power controller 1210 is indicative of the user transitioning the device from the off-position to the on-position and is thus attempting to transition the device from the deactivated state to the activated state. The controller 1240 may generate a relay signal 1290 to transition a relay 1215 from the open state to the closed state in response to the impedance level signal 1280 exceeding the threshold.

The transitioning of the relay 1215 from the open state to the closed state enables output AC power 1255 transferred by the AC power output prong connector 1220 to pass through the relay 1215 that is in the closed state and to be provided to the AC power cord receptacle 1230 as output AC power 1265. As noted above, the solar panel 100 may generate output AC power 195*n* and provide that output AC power as output AC power 1250 to the standard wall outlet 906 that the power controller 1210 is coupled to. The output AC power 1250 may also be provided by the electric utility grid 808 to the standard wall outlet 906. The power controller 1210 is then coupled to the standard wall outlet 906 via the AC power outlet prong connector 1220. As the output AC power 1250 is provided to the AC power outlet prong connector 1220 from the standard wall outlet 906, the output AC power 1250 is transferred into the power controller 1210 as output AC power 1255 via the AC power outlet prong connector 1220.

The output AC power 1255 is then transferred to the AC power cord receptacle 1230 when the relay 1215 is transitioned into the closed state. As noted above, the controller 1240 may generate the relay signal 1290 to transition the relay 1215 into the closed state when the impedance level signal 1280 exceeds the threshold in anticipation that the user is attempting to transition the device from the deactivated state to the activated state. The transitioning of the relay 1215 into the closed state enables the output AC power 1255 to pass through the relay 1215 and is provided to the AC power cord receptacle 1230 as output AC power 1265. The AC power cord receptacle 1230 may then transfer the output AC power 1265 to the device as output AC power 1270. The device may then be transitioned into the activated state as the output AC power 1270 provides sufficient power for the device to consume and operate at the wattage associated with the device.

For example, the user attempts to transition the lamp from the deactivated state to the activated state by transitioning the lamp from the off-position to the on-position. In doing so, the lamp generates the impedance signal 1260 that represents the impedance of the light bulb being introduced to the power controller 1260 while the light bulb is still in the deactivated state and is not consuming the wattage associated with the light bulb when operating in the activated state. The controller 1240 then monitors the impedance level signal 1280 and determines that the impedance level signal 1280 exceeds the threshold associated with the impedance level introduced by the light bulb when the user transitions the lamp into the on-position but the light bulb is still in the activated state.

The controller 1240 assumes that the user is attempting to transition the lamp from the deactivated state to the activated state and automatically generates the relay signal 1290 to transition the relay 1215 from the open position to the closed position. The output AC power provided by the standard wall outlet 906 then passes through the relay 1215 and is provided to the AC power cord receptacle 1230 as output AC power 1270. The light bulb then transitions into the activated state and consumes the output AC power 1270 such the light bulb operates at the wattage associated with the light bulb.

After the device has transitioned into the activated state and is consuming wattage at a level associated with the device, the device may generate the impedance signal 1260 that is significantly higher than the threshold indicating that the device is consuming wattage. As the device operates in the activated state, the impedance level that the device introduces to the power controller 1210 significantly increases above the threshold as compared to when the user transitions the device from the off-position to the on-position but the device has still not transitioned into the activated state. The controller 1240 may then monitor the impedance level signal 1280 and continue to maintain the relay 1215 in the closed state as the impedance level signal 1280 is maintained above the threshold indicating the user requests to continue to have the device operate in the activated state.

The controller 1240 may generate a power data signal 1275 when the device has transitioned to the activated state and is consuming wattage. As noted above, the controller 1240 generates the relay signal 1290 to transition the relay 1215 from the open state to the closed state and output AC power 1270 generated by the standard wall outlet 906 is provided to the device and thus activating the device. The controller 1240 may generate the power data signal 1275 such that the transceiver 1205 generates the power data signal 1285 and transmits the power data signal 1285 to the user's smart phone 920 as well via an Internet infrastructure, such as the cloud.

The power data signal 1285 may then activate the software application operating on the user's smart phone 920 that is associated with monitoring the power data generated by the device as well as providing the power data to the user via the user's smart phone 920. The power data signal 1285 may activate the software application thus notifying the software application that the device is currently operating in the activated state and is consuming power and as well as generating power data. The power data signal 1285 may transmit power data that is generated by the device as the device consumes power to the cloud and the user's smart phone 920. The user may then monitor the power data generated by the device as the device consumes power in the activated state as well as remotely control the device the via the user's smart phone 920.

The controller 1240 may monitor the power requirements associated with the device that is coupled to the AC power cord receptacle 1230. After the device has been coupled to the AC power cord receptacle 1230, the device may generate the power requirement signal 1225 which includes the power requirements of the device as well as other power characteristics such as the power profile. The power profile may provide information as to how the device consumes power once activated. For example, the power profile may provide how quickly the device ramps up to consuming the maximum amount of power to power the device as well as how the amount of power consumes varies as the device executes different cycles and/or tasks.

The controller 1240 may monitor the power requirement data signal 1215 which includes the power requirements of the device as originally provided in the power requirement signal 1225. The controller may monitor the power requirement data signal 1215 to determine the power requirements of the device that has been coupled to the AC power cord receptacle 1230 in anticipation of the device being activated. For example, the 500 W portable heater may be coupled to the AC power cord receptacle 1230. The controller 1240 may determine the power requirements of the 500 W portable heater as provided by the power requirement data signal 1215. Although, the 500 W portable heater consumes 500 W when operating at the highest heat level, the 500 W portable heater may have adjustable heat settings where the 500 W portable heater consumes less watts than 500 W when operating at those lower heat settings. The controller 1240 may determine the different power levels that the 500 W portable heater consumes when operating at those lower heat settings from the power requirement data signal 1215.

The controller 1240 may continue to monitor the power requirement data signal 1215 to determine when the device has been activated. The controller 1240 may generate the output AC power control signal 1205 to control the amount of output AC power 1255 that is provided to the device based on the amount of power that the device requires to operate as based on the power requirement data signal 1215. The controller 1240 may control the amount of output AC power 1255 provided to the device via the output AC power control signal 1205 such that the amount of output AC power 1255 that is provided to the device is the amount of output AC power that the device requires to adequately operate to satisfy the user's needs.

As noted above, the solar panels 100(*a-n*) generate output AC power 1250 and provide the output AC power 1250 to the AC power outlet prong connector 1220. The output AC power 1250 provided to the AC power outlet prong connector 1220 may be greater than the amount of output AC power required by the device to adequately operate. Thus, the controller 1240 may limit the amount of output AC power 1255 that is provided to the device to the amount of output AC power that the device requires to adequately operate via the power requirement data signal 1215.

For example, amount of output AC power 1250 generated by the three solar panels 100(*a-c*) that are daisy chained together is 1500 W. However, the amount of output AC power that the 500 W portable heater that is coupled to the AC power cord receptacle 1230 is significantly less than 500 W. The controller 1240 may generate the output AC power control signal 1205 to limit the amount of output AC power 1255 provided to the 500 W portable heater to substantially 500 W. The controller 1240 may then continuously monitor the power requirement data signal 1215 to determine whether the power requirements of the 500 W portable heater change. For example, the user may adjust the portable heater to a lower heat setting such that the portable heater now requires 250 W. The controller 1240 may determine via the power requirement data signal 1215 that the portable heater now requires 250 W to operate and may adjust the output AC power 1255 available to the portable heater via the output AC power control signal 1205 accordingly.

The controller 1240 may ensure that the device coupled to the AC power cord receptacle 1225 has sufficient output AC power as generated by the solar panels 100(*a-n*) so that the device solely operates off of the output AC power provided by the solar panels 100(*a-n*) and no additional output AC power as generated by the electric utility grid is required by the device. The controller 1240 may monitor the solar panel output AC power signal 1295 to determine the amount of output AC power stored in the solar panels 100(*a-n*) that is available to be consumed by the device coupled to the AC power cord receptacle 1230. As noted above, the controller may also monitor the power requirement data signal 1215 to determine the power requirements of the device.

Based on the amount of output AC power available from the solar panels 100(*a-n*) and the power requirements of the device, the controller 1240 may adjust the output AC power control signal 1205 to control the amount of output AC power 1255 that is available to the device such that the output AC power 1255 is solely provided by the solar panels 100(*a-n*). In doing so, the controller 1240 may control the amount of output AC power 1255 available to the device to ensure that sufficient output AC power 1250 as generated by the solar panels 100(*a-n*) is available for the device to consume even during spikes of output AC power usage by the device. This may prevent the output AC power 1255 from including any output AC power generated by the electric utility grid solely limiting the output AC power 1255 consumed by the device as being generated by the solar panels 100(*a-n*).

The controller 1240 may also monitor the solar panel output AC power signal 1295 to determine whether the solar panels 100(*a-n*) have excess output AC power stored that is exceeds the power requirements of the user and/or typical dwelling 804. During instances when the solar panels 100(*a-n*) do have excess output AC power that exceeds the power requirements of the user and/or typical dwelling 804, the controller 1240 may generate the output AC power control signal 1205 such that the excess output AC power stored by the solar panels 100(*a-n*) is provided to the electric utility grid via the excess output AC power signal 1235. The excess output AC power as stored by the solar panels 100(*a-n*) may be transported to the electric utility grid via the excess output AC power signal 1235 such that the user and/or owner of typical dwelling 804 may be compensated for the excess output AC power provided to the electric grid rather than consumed from the electric utility grid.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made without departing from the spirit and scope of the present disclosure. Thus the present disclosure should not be limited by any of the above-described exemplary embodiments, but should be defined only in accordance with the following claims and their equivalents.

What is claimed is:

1. An outlet power controller assembly that is an independent component independent from at least one solar panel that transfers output alternating current (AC) power generated by the at least one solar panel, comprising:
    a power connector assembly coupled to an alternating current (AC) power outlet and configured to transfer AC power generated by the at least one solar panel from the AC power outlet to at least one power cord that is coupled to the power controller configuration, wherein the at least one power cord transfers the AC power generated by the at least one solar panel to at least one device that consumes the AC power provided by the AC power outlet; and
    an outlet power controller configured to control the at least one device that consumes the AC power provided by the AC power outlet and generated by the at least one solar panel based on instructions received from a communications device via wireless communication between the outlet power controller and the communications device.

2. The outlet power controller assembly of claim 1, wherein the outlet power controller is further configured to:
    provide power data generated by the at least one device as the at least one device consumes the AC power provided by the AC power outlet to the communications device, wherein the power data is data associated with the AC power consumed by the at least one device provided by the AC power outlet.

3. The outlet power controller assembly of claim 1, wherein the outlet power controller is further configured to monitor an impedance level of the outlet power controller assembly and control the at least one device that consumes the AC power provided by the AC power outlet based on a change in the impedance level of the outlet power controller assembly.

4. The outlet power controller assembly of claim 3, wherein the outlet power controller is further configured to activate the at least one device that consumes the AC power provided by the AC power outlet when the impedance level of the outlet power controller assembly exceeds a threshold.

5. The outlet power controller assembly of claim 4, wherein the outlet power controller is further configured to instruct the communications device that the at least one device is activated when the impedance level of the outlet power controller assembly exceeds the threshold.

6. The outlet power controller assembly of claim 4, wherein the outlet power controller is further configured to activate the at least one device that consumes the AC power provided by the AC power outlet when the impedance level of the outlet power controller assembly transitions from an open circuit to the impedance level that exceeds the threshold.

7. The outlet power controller assembly of claim 6, wherein the outlet power controller assembly further comprises:

a relay configuration that couples the at least one device to the AC power outlet when the relay configuration is in the closed state and is configured to transition from an open state to the closed when the outlet power controller determines that the impedance level of the outlet power controller assembly exceeds the threshold.

8. A method for wirelessly controlling at least one device that consumes alternating current (AC) power generated by at least one solar panel and provided by an AC power outlet, comprising:
transferring AC power generated by the at least one solar panel from the AC power outlet to at least one power cord coupled to a power controller configuration, wherein the at least one power cord transfers the AC power to at least one device that consumes the AC power generated by the at least one solar panel and provided by the AC power outlet; and
controlling the at least one device that consumes the AC power provided by the AC power outlet based on instructions received from a communications device via wireless communication between the outlet power controller and the communications device.

9. The method of claim 8, further comprising:
providing power data generated by the at least one device as the at least one device consumes the AC power provided by the AC power outlet to the communications device, wherein the power data is associated with the AC power consumed by the at least one device provided by the AC power outlet.

10. The method of claim 8, further comprising:
monitoring an impedance level of the outlet power controller assembly; and
controlling the at least one device that consumes the AC power provided by the AC power outlet based on a change in the impedance level of the outlet power controller assembly.

11. The method of claim 10, wherein the controlling comprises:
activating the at least one device that consumes the AC power provided by the AC power outlet when the impedance level of the outlet power controller assembly exceeds a threshold.

12. The method of claim 11, further comprising:
instructing the communications device that at least one device is activated when the impedance level of the outlet power controller assembly exceeds the threshold.

13. The method of claim 11, wherein the controlling further comprises:
activating the at least one device that consumes the AC power provided by the AC power outlet when the impedance level of the outlet power controller assembly transitions from an open circuit to the impedance level that exceeds the threshold.

14. The method of claim 13, wherein the controlling further comprises:

coupling the at least one device to the AC power outlet with a relay configuration when the relay configuration is in the closed state; and
transitioning the relay configuration from an open state to the closed state when impedance level of the outlet power controller assembly exceeds the threshold.

15. An outlet power controller assembly that is an independent component that is independent from at least one solar panel that transfers output alternating current (AC) power generated by the at least one solar panel, comprising:
a power connector assembly coupled to an alternating current (AC) power outlet and configured to transfer the AC power generated by the at least one solar panel to at least one power cord that is coupled to the power controller configuration, wherein the at least one power cord transfers the AC power generated by the at least one solar panel to at least one device that consumes the AC power provided by the AC power outlet; and
an outlet power controller configured to control the at least one device that consumes AC power generated by the at least one solar panel and provided by the AC power outlet based on monitoring an impedance level of the outlet power control assembly.

16. The outlet power controller assembly of claim 15, wherein the outlet power controller is further configured to control the at least one device that consumes AC power provided by the AC power outlet based on a change in the impedance level of the outlet power controller assembly.

17. The outlet power controller assembly of claim 16, wherein the outlet power controller is further configured to activate the at least one device that consumes the AC power provided by the AC power outlet when the impedance level of the outlet power controller assembly exceeds the threshold.

18. The outlet power controller assembly of claim 17, wherein the outlet power controller is further configured to instruct the communications device that the at least one device is activated when the impedance level of the outlet power controller assembly exceeds the threshold.

19. The outlet power controller assembly of claim 17, wherein the outlet power controller is further configured to activate the at least one device that consumes the AC power provided by the AC power outlet when the impedance level of the outlet power controller assembly transitions from an open circuit to the impedance level that exceeds the threshold.

20. The outlet power controller assembly of claim 19, wherein the outlet power controller assembly further comprises:
a relay configuration that couples the at least one device to the AC power outlet when the relay configuration is in the closed state and is configured to transition from an open state to the closed state when the outlet power controller determines that the impedance level of the outlet power controller assembly exceeds the threshold.

* * * * *